United States Patent
Shah et al.

(10) Patent No.: US 10,261,499 B2
(45) Date of Patent: Apr. 16, 2019

(54) DEVICE AND METHOD OF MANUFACTURING CUSTOMIZABLE THREE-DIMENSIONAL OBJECTS

(71) Applicants: Samir Shah, Richmond (CA); Abir Shah, Richmond (CA); Shikhar Shah, Richmond (CA)

(72) Inventors: Samir Shah, Richmond (CA); Abir Shah, Richmond (CA); Shikhar Shah, Richmond (CA)

(*) Notice: Subject to any disclaimer, the term of this patent is extended or adjusted under 35 U.S.C. 154(b) by 0 days.

(21) Appl. No.: 15/112,313

(22) PCT Filed: Jan. 28, 2015

(86) PCT No.: PCT/US2015/013380
§ 371 (c)(1),
(2) Date: Jul. 18, 2016

(87) PCT Pub. No.: WO2015/119819
PCT Pub. Date: Aug. 13, 2015

(65) Prior Publication Data
US 2016/0332369 A1 Nov. 17, 2016

Related U.S. Application Data

(60) Provisional application No. 61/935,821, filed on Feb. 4, 2014, provisional application No. 61/943,894, filed on Feb. 24, 2014.

(51) Int. Cl.
*G05B 19/4099* (2006.01)
*B33Y 10/00* (2015.01)
(Continued)

(52) U.S. Cl.
CPC ........ *G05B 19/4099* (2013.01); *B29C 64/106* (2017.08); *B29C 64/147* (2017.08);
(Continued)

(58) Field of Classification Search
CPC ..... B29C 64/147; B29C 70/38; B29C 64/106; Y10T 156/1052; G05B 19/4099; B33Y 10/00; B33Y 30/00
See application file for complete search history.

(56) References Cited

U.S. PATENT DOCUMENTS 4,508,584 A * 4/1985 Charles ................ B29C 70/388
156/353
4,752,352 A 6/1988 Feygin
(Continued)

FOREIGN PATENT DOCUMENTS

EP 1974905 A1 10/2008
EP 2314445 A1 4/2011

OTHER PUBLICATIONS

European Patent Office, Search Report, EP National phase appl. No. 15746793.7-1703 I 3102411, present PCT Applic. No. PCT/US2015013380, dated Oct. 26, 2017, Munchen, Allemagne, Germany.
(Continued)

*Primary Examiner* — Mark A Osele
*Assistant Examiner* — Christopher C Caillouet
(74) *Attorney, Agent, or Firm* — Louis Ventre, Jr.

(57) ABSTRACT

A device, method and layered product produced from the method are disclosed. The method uses new fabrication steps involving stratified additive manufacturing. Steps include preparing continuous ribbons of solid first material and possibly a second material; rolling continuous ribbon onto a spool held within a feeder cassette configured to dispense continuous ribbon through a slit; loading each feeder cassette onto an engagement dock; dispensing on the bed of the machine a first strip of continuous ribbon; cutting it to a length and having an end profile as directed by digital specification programmed on the machine; and creating a layered object by dispensing, cutting and applying addi-
(Continued)

tional strips of continuous ribbon atop the previously dispensed strips in accordance with the digital specification. The apparatus includes a computer numerical control machine feeding strips of ribbon from the feeder cassettes loaded in an engagement dock.

7 Claims, 12 Drawing Sheets

(51) Int. Cl.
*B29C 70/38* (2006.01)
*G05B 19/18* (2006.01)
*B33Y 30/00* (2015.01)
*B29C 64/106* (2017.01)
*B29C 64/147* (2017.01)
*B33Y 50/02* (2015.01)

(52) U.S. Cl.
CPC .............. *B29C 70/38* (2013.01); *B33Y 10/00* (2014.12); *B33Y 30/00* (2014.12); *G05B 19/188* (2013.01); *B33Y 50/02* (2014.12); *G05B 2219/35134* (2013.01); *G05B 2219/49007* (2013.01); *Y02P 80/40* (2015.11)

(56) References Cited

U.S. PATENT DOCUMENTS

| 5,481,083 | A | 1/1996 | Smyth, Jr. |
| 6,165,307 | A | 12/2000 | Fair et al. |
| 6,478,229 | B1 | 11/2002 | Epstein |
| 2004/0098852 | A1 | 5/2004 | Nelson |
| 2007/0144676 | A1* | 6/2007 | Tang ................. B29C 70/386 156/425 |
| 2012/0018072 | A1* | 1/2012 | Ueno ................. C08J 5/24 156/60 |
| 2012/0186749 | A1* | 7/2012 | Cramer ............. B29C 70/386 156/360 |

OTHER PUBLICATIONS

U.S. Patent and Trademark Office, ISR and Written Opinion, dated May 7, 2015, Alexandria, VA, US.

\* cited by examiner

DEVICE AND METHOD OF MANUFACTURING CUSTOMIZABLE THREE-DIMENSIONAL OBJECTS

CROSS-REFERENCE TO RELATED APPLICATIONS

This application claims the benefit of U.S. Provisional Application No. 61/935,821, filed 4 Feb. 2014, and U.S. Provisional Application No. 61/943,894, filed 24 Feb. 2014, which are, in their entirety, hereby incorporated by reference herein.

TECHNICAL FIELD

In the field of adhesive bonding and miscellaneous chemical manufacture, a device and methods for the manufacture of articles uniting together at least two lamina.

BACKGROUND ART

Additive and subtractive manufacturing technologies enable computer designs, such as CAD files, to be made into three-dimensional ("3D") objects. 3D printing, also known as additive manufacturing, typically comprises depositing, curing, fusing, or otherwise forming a material into sequential cross-sectional layers of the 3D object. Fused deposition modeling techniques include melting a filament of build material and extruding the print material out of a dispenser that is moved in the x-, y-1 and z-axes relative to a print pad. The raw material is generally deposited in layers in the x- and y-axes to form cross-sectional layers that are stacked along the z-axis to form the 3D object.

Three-dimensional printing of physical models has proven useful in a wide variety of settings. Some potential uses include production of anatomical bodies like bones for research and clinical applications, medical product development, machine design and equipment design, to name just a few. 3D printing or rapid prototyping refers to a collection of technologies for producing physical parts directly from digital descriptions.

Digital descriptions include output of any software that produces a 3D digital model. One example of such software is Computer-Aided Design (CAD) software. Creating a 3D digital model from a 3D image data set requires specialized imaging or CAD software. Rapid prototyping machines have been commercially available since the early 1990's, the most popular versions of which employ a liquid or a powder to build a desired structure by adding building material layer-by-layer based on a digital three-dimensional model of the structure.

Conventionally to date, one equates 3D printing materials with being liquid or particle plastic, resin or metal. There is, however, a desire to use "natural" materials with a unique aesthetic. For example, VOXELJET, a company that provides high-speed, large-format 3-D printers is developing new material sets, including additional sands, ceramics, cement and wood powder. VOXELJET'S printers use powder binding technology, which involves chemical binding agents used to bind together the material being printed.

SUMMARY OF INVENTION

A device, method and layered product produced from the method are disclosed. The method uses new fabrication steps involving stratified additive manufacturing. A first step includes preparing continuous ribbons of solid first material and possibly a second material. The ribbons of first material have different widths. Additional steps include: rolling each continuous ribbon onto a spool held within a feeder cassette that is configured to dispense continuous ribbon through a slit; loading each feeder cassette onto an engagement dock of a computer numerical control machine; dispensing on the bed of the machine a first strip of continuous ribbon; cutting the strip to a length and bestowing or imparting an deliberately chosen end profile to the strip as directed by digital specification programmed on the machine; and creating a layered object by dispensing, cutting and applying additional strips of continuous ribbon atop the previously dispensed strips in accordance with the digital specification.

Optionally, butt joints of continuous ribbon are covered by the layer above forming a woven connectivity. The ribbon material may be any of a wood veneer, metal, plastic, cork, leather, fabric, fiber and any combination of these. An adhesive may be added to the bottom surface of the ribbon. An RFID tag may also be added the ribbon as well as particles to give properties of an electrical conductor, an electrical insulator, a paint, a dye and a pigment, a chemically reactive agent; and a penetrant. A final or intermediated step if computer numerical control milling the layered object may be performed on the machine.

The device for the practice of the method includes a computer numerical control machine operating by a programmed digital specification to position the strips of ribbon fed from the feeder cassettes loaded in an engagement dock. A motor-driven ribbon application head dispenses, cuts with a blade, and applies the strips as directed by the digital specification.

Technical Problem

There are drawbacks to currently available technologies in regards to "organic natural fibrous" materials: namely, how to attain the desired natural look. Handcrafted solid wooden furniture has been popular because of its unique aesthetic, including durability, feel, grain patterns, color, etc. Also, wooden furniture has always been expensive because of the high costs of quality wood, experienced craftsman as well as the high demand from the market. So, even though there is interest in wood-like objects made by additive manufacturing techniques, there is still the discerning demand from consumers that the objects so formed look and act like real wood. To date, this has not been accomplished. Prior art objects, which are made with slurry wood pulp and fused or glued wood powder, do not have the characteristics of real wood namely the fibrous characteristics. The longitudinal and ray cells of the cambium that give wood its strength and visual characteristics are destroyed by powdering wood which is used directly or with a glue as slurry, and in most ways no longer retain the properties of natural wood.

Any solid, natural wood object today is made "subtractively" in that every component of the object has been reduced to its finished shape and size by cutting out of a larger size of wood. Each of the components needs separate shaping, handling and assembly into its final form, with all activity of milling and joinery being performed separately on different machines.

In the woodworking industry many through-processes exist where a block of wood fed at one end, exits the other end of a complex system, with all the activities performed upon it in a systematic manner to make it ready for use and/or assembly. Each activity is separate since activity such as shaping and joinery are rarely simultaneous and united on the same equipment. Each activity is also modularly-linked to the overall process, and each activity involves losing material in a subtractive process, such as sawing, trimming, shaping (curves, etc.), and molding (removing linear material from a larger piece to achieve a specific profile of material).

Large scale woodworking implies manufacturing in bulk at a central plant for efficiencies and economy. This involves considerable shipping to the factory and from it to the end user. Various species of raw material (wood) are often not available locally and have to be imported to the central plants before processing and reshipping to the destination. To achieve large-volume throughput, the equipment and process are not designed for customized object creation.

Multiple species of wood are rarely used simultaneously in the same object, and it is hard to request a change to shape and size, or other forms of customization from the manufacturer. This has implied division of the industry of woodworking into three general scenarios:

Conventional fabrication often uses the import model employing large scale generic manufacturing at lower prices done at centralized plants located usually at a great distance (often overseas).

Alternatively, a small factory model uses medium-scale semi-customized manufacturing at substantially higher prices but produced within 1000 miles of the customer.

There is also a custom produced model employing fully customized production in very small quantities and at extremely high price, done only where the expertise for it lies, which could be overseas or could be next door to the end-user.

With existing systems when speed of production is desired, the import model is generally considered the fastest manufacturing. The custom produced model is the slowest. For flexibility of economical manufacturing the import model is least flexible for custom variation, and the custom model is most flexible to permit variation and design.

In conventional woodworking, metal or plastic materials can only be added on to the exterior of the object as accessories. To form a bonded and internalized part of the product inserted objects into wooden components must induce further subtractive woodworking, extra processes and handling during manufacturing (for example, to have a metal rod inside a leg of a chair for additional strength the process requires drilling a hole for it from the outside or some other method of insertion that replaces existing wood).

Subtractive manufacturing currently employed cannot change the physical properties of natural wood and lower the weight of a wooden object with hollow interiors or, make interiors entirely out of components from lower weight materials, or have a different species of wood inside from the one on the outside. It is possible to do so only by drilling from the outside (more subtraction and waste) and then leaving a hollow space or replacing that space by an alternate material.

There is a negative cost implication for current manufacturing methods and technologies when hollow interiors are needed and when multiple materials are needed in a single object. Both type of insertions for strength per add-on or for lower weight per subtractive processing are cumbersome additional steps which add a large proportion of cost when compared with unaltered solid wood object of the same external shape and size.

Current manufacturing techniques often detract from the visual/tactile characteristics of natural wood. Besides problems related to manufacturing, there is still the issue of dealing with the characteristics of wood and its fibrous structure. Solid wood slabs, or solid wood plates, or solid wood panels have a surface which have a typical grain (natural fibrous structure), character (visual appeal) and feel (texture). It also receives polishes and finishing materials in a certain manner (varying by species). Due to established costs of handling and wastage known to the industry, attempts have been made to achieve strength and appearance and feel via alternate methods. To counter the costs of handling and time and energy consumed to 'stabilize' real solid wood, alternatives have been created and invented and an entire economy has grown around it.

Recent innovations (last 100 years) cover manufacturing machinery, flat packed product, specialized knock-down hardware, and even sales-and-distribution methods, such as the successful operations instituted by companies like IKEA.

These innovations were largely created expressly to counter the costs related to working with natural wood. Any process attempting to reproduce the appeal and texture of real wood is being offered today by use of artificial materials such as polymer films, printed papers (laminates), and so on. It is important to understand that reference here is to solid wood and not panel board material. These films and paper sheets cannot replace the strength of solid wood, and are merely a fascia upon a substrate like plywood, or chipboard, or medium-density fibreboard (MDF), etc. to give it an appearance of wood. Many products today can as easily be built from sheets of metal or plastic as they are from plywood and MDF, but cannot as easily replace the form and flow of solid wood.

There is no available method or technology to obviate or mitigate the above drawbacks and features of conventional manufacturing, particularly in the field of natural materials, where automated manufacturing and customization are simultaneous and also economical.

Solution to Problem

The solution to the problems noted above is a device and process described as stratified additive manufacturing (SAM). This process is unlike conventional subtraction that removes material to produce an object. Rather, the process builds a solid object from a series of strips of ribbon material. The strips are joined to each other in layers with each layer applied and adhered on top of a previous layer. The process employs a computer aided design of an object using software that records a series of digital slices or layers of the entire object. The pattern of each slice of the designed object is used on a 3D-build machine to define the respective layers for fabrication on the machine. A continuous ribbon of the fabrication material is partially unwound from a spool and cut to smaller strips that are laid down on the bed of the 3D-build machine to eventually build to a close approximation of the final form of the object as controlled by the digital specification.

Advantageous Effects of Invention

The devices and methods disclosed teach a layered additive manufacturing method for the creation of customizable 3-D objects and artifacts made of materials including but not limited to solid wood, fabric, fiber, metal and plastic (polymers). The steps disclosed employ a computer implemented instruction set which is executed by an automated machine for distributed manufacturing. Unique materials are used combined with unique fabrication techniques. A unique system for layered additive manufacturing is disclosed.

The device and methods reduce the costs from wastage that otherwise would be incurred due to subtraction and the complex machine-systems related to conventional woodworking. It is no longer necessary to ship to a manufacturing facility those portions of the material that would have been ultimately wasted. In other words: cut-away pieces, sawdust, wasted ends and sides of real wood in subtractive manufacturing are no longer being shipped to the place of manufacture and then being discarded. This makes the disclosed devices and methods more environmentally friendly in terms of waste and the shipping-related carbon footprint.

In respect to wood, existing methods have sidelined efforts to use of solid, natural wood, the new methods and devices disclosed embrace the use of wood veneer, that is, solid, natural wood. The device and methods disclosed make it possible to create myriad effects via this process so "classic woodworking" would dictate how the grain runs, however, the process permits grain in multiple directions on the same layer, or in a direction contrary to convention for design effect.

The device and methods disclosed minimize and often eliminate the need for skilled labor to assemble products in large plants. Additionally, virtually no ultra-skilled craftsmanship is required for boutique operations. It is a major benefit to be able to avoid the need for skilled labor because such skilled labor is difficult to find and growing scarcer. Being able to avoid the need for skilled labor avoids a major expense and resulting regression to woodworking as a whole.

The methods and devices disclosed can reduce costs and increase efficiencies with wood or most existing material. For wood, it has been taken for granted that only new materials replacing wood could reduce costs and increase efficiencies.

The methods and devices disclosed can unite the design and manufacture of wood products while retaining a close relationship with the natural material. Previously, products were moving further away in their design, construction and feel from wood and retaining only a tenuous relationship to the natural material.

The methods and devices disclosed can vastly increase the furniture products made from natural wood and other artifacts useful for any wood application. Previously, the industry has created a whole new realm of design and furniture styles dependent upon the non-natural-wood materials and effectively left a vacuum of products made from natural wood.

The methods and devices disclosed provide a high quality, affordability, design, style, using a socially conscious method not now available for the production of solid wood objects.

The method and system of the present invention represents an industry-level change in that it successfully manages to reduce waste, lower overhead related to shipping and handling, reduce time from order-to-delivery, manufacture mass-customized objects, change the math for manufacturing economy (from high-investment to low investment), create multi-material products, and significantly enhance the properties of natural and solid wood in its use for making objects, while ensuring the visual and tactile characteristics are not compromised, nor substituted by alternatives arising out of reconstitution of wood into flour or fibers as possible in other forms of additive manufacturing.

The present invention provides a method, system and apparatus for the 'formation' or 'building' of a 3-D solid wood object via an automated additive manufacturing process, untouched by human hand, and with consistency of production if replicated in different locations. The invention comprises of a method, an apparatus/machine that translates the method into an object and final product. In a preferred form, the method is intended to direct/drive the apparatus/machine 'remotely' by instructions delivered to it via digital files.

The method of the invention allows distributive manufacturing and a lowered carbon footprint in distribution as well. A network of relatively small machines (to implement the method) located close to consumers instead of distant centralized production helps to radically change logistics. Preferably, the products are created via digital instructions to the apparatus/machines from a computer-coded file, delivered via the internet from a server, or via a dedicated connection. By these means, all and any apparatus/machines linked to a network can function identically for consistent results anywhere in the world where such apparatus/machines are located. This reduces the need for shipping and packaging (of finished goods) by this remote-digital-distribution method. Since goods are not produced overseas, but near the consumer} local delivery requires less elaborate packaging and waste of packing materials. International shipping and delivery to local warehouses is eliminated.

Furthermore, with remote production done on project-selected apparatus/machines (for example smaller machines for smaller projects), the additive manufacturing method of the invention allows customization to every piece individually or repetitive production at the same speed. The result is reduced production time for customized objects and shorter delivery times due to localized production.

Reduced wastage and minimal shipping reduces costs significantly. Since each machine produces products after orders are received, inventory, investment, warehousing space, etc. are also reduced to lower costs. To put in context, a stratified additive manufacturing machine with some ancillary equipment acts as a mini-factory that may need no more than 8,000 sq. ft of light industrial space, to serve a community of approximately 1.0 million people. There is no need for costly supply chain management and related issues.

The custom produced model of manufacturing and the ability to use multiple materials (for example species of wood) simultaneously in any object or across objects as part of a single work-order is also unique. It is possible to incorporate multi-material construction for lightweight and stronger structure, retain the character and texture of real wood, and add substantially to the overall strength of a comparable product.

Design files arriving to the machine as computer code can originate from the customer or a designer of the objects, for example: furniture and artifacts. It is easy for a consumer to modify such files before ordering production after having visualized a product on screen for precise production. In this way, design and production (even remotely) becomes a seamless, dynamic operation.

BRIEF DESCRIPTION OF DRAWINGS

The drawings illustrate preferred embodiments of the device and method of manufacturing customizable three-dimensional objects according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

Figure 1:
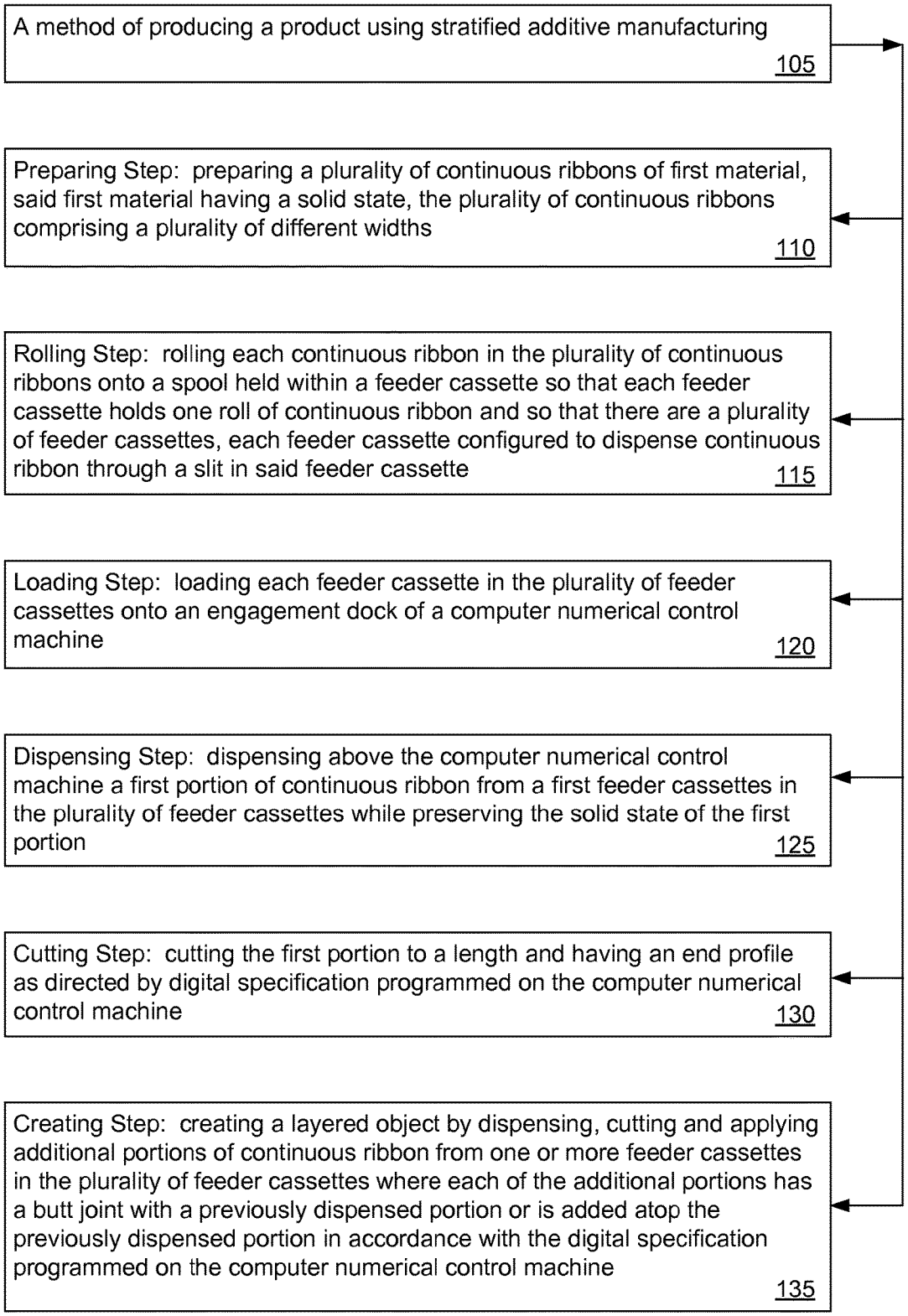
FIG. 1 is a diagram of preferred steps in the method of producing a product using stratified additive manufacturing.

With reference to FIG. 1, the method (105) in brief is one for producing a product (800) using stratified additive manufacturing. Stratified additive manufacturing is a newly disclosed process that adds together cut ribbons of material in such a way that it minimizes waste to produce a final three-dimensional product. It is different from simple edge-banding in that the layering process is a repetitive building process of an object itself, whereas edge-banding processes are exclusively to treat or finish an otherwise exposed edge (thickness) of a panel (board) material like plywood, chipboard, medium-density fibreboard, or similar material.

The method (105) preferably includes a Preparing Step (110), a Rolling Step (115), a Loading Step (120), a Dispensing Step (125), a Cutting Step (130), and a Creating Step (135).

Figure 2:
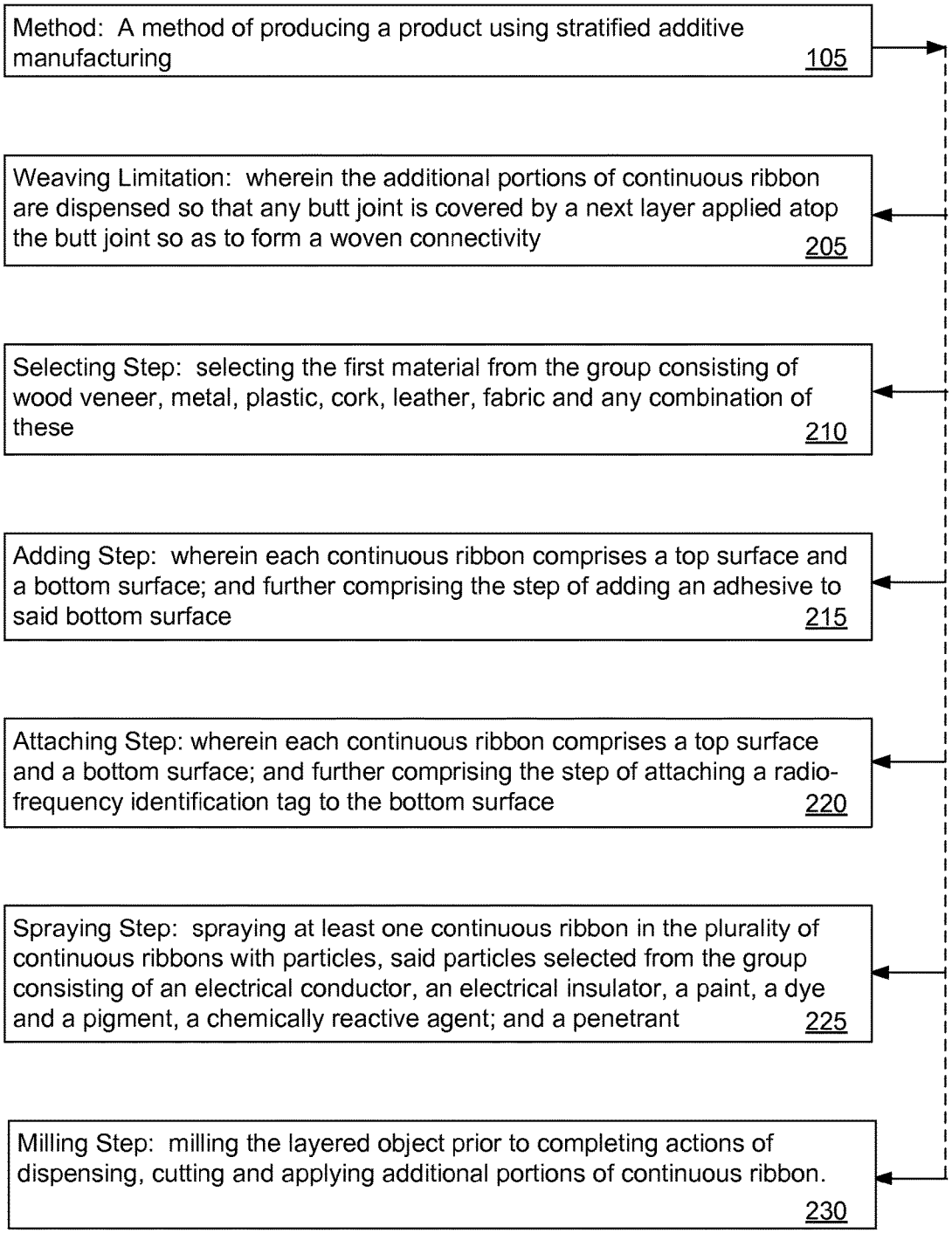
FIG. 2 charts additional steps in the method of producing a product using stratified additive manufacturing.
Figure 3:
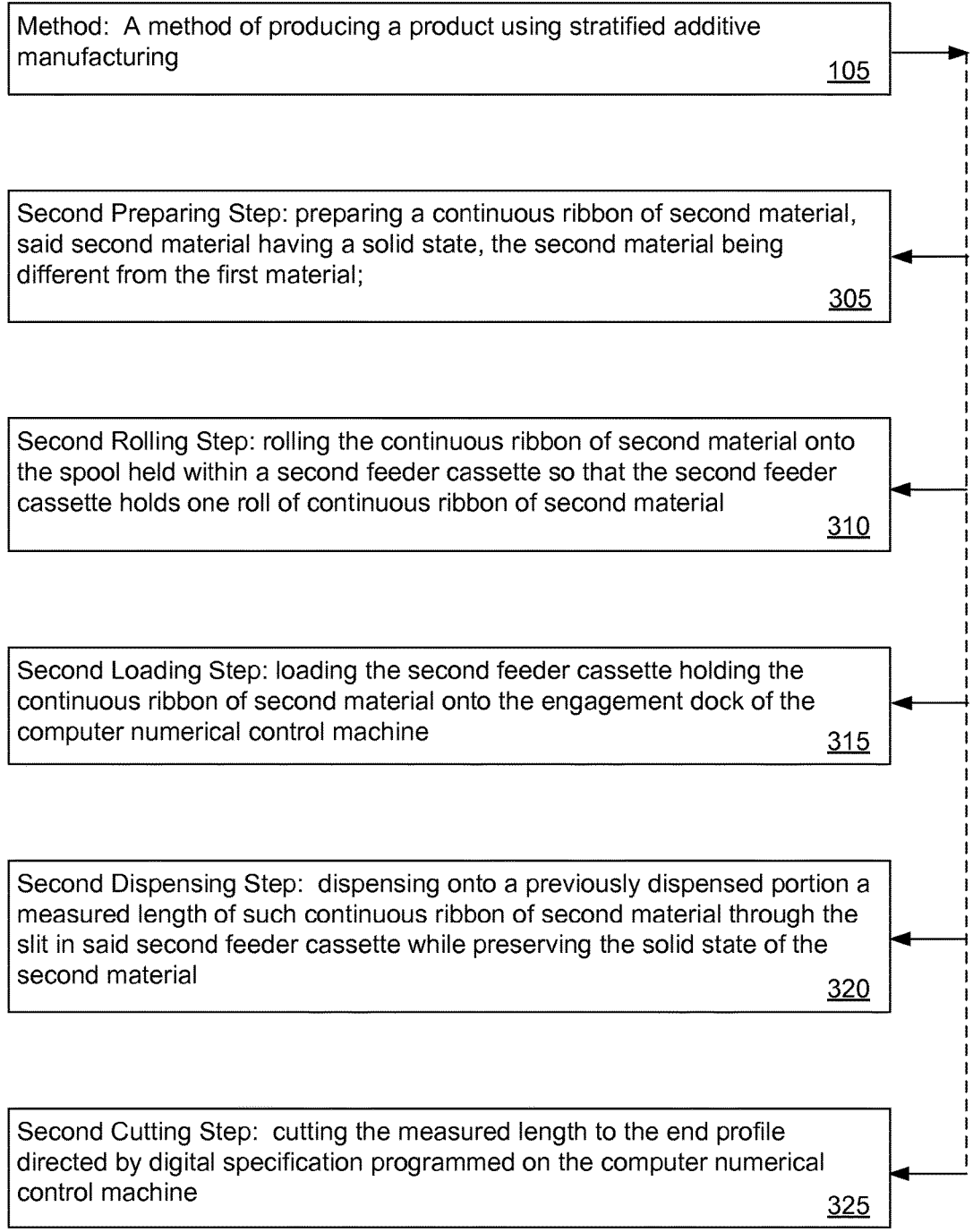
FIG. 3 identifies additional steps in the method of producing a product using stratified additive manufacturing.

FIG. 2 and FIG. 3 identify additional preferred steps and limitations that may be implemented. These include a Weaving Limitation (205), a Selecting Step (210), an Adding Step (215), an Attaching Step (220), Spraying Step (225), a Milling Step (230), a Second Preparing Step (305), a Second Rolling Step (310), a Second Loading Step (315), a Second Dispensing Step (320), and a Second Cutting Step (325).

FIG. 1, FIG. 2 and FIG. 3 are not flow diagrams in that the steps may be performed in any order that the independent claim permits to reach the layered object (405). Thus, these figures are not characterized with arrows flowing from one box to the next, but rather the arrows flow from a line that connects all of the boxes to reinforce the concept that the order of the steps may be varied when permitted by the wording of the claimed method (105).

The Preparing Step (110) includes preparing a plurality of continuous ribbons (1105) of first material (835). A continuous ribbon (1210) as used herein means a long, narrow strip of material that may be subsequently cut into smaller lengths for use in the disclosed process. Preferably, a continuous ribbon (1210) will have a width from about 6 millimeters up to about 300 millimeters and have a thickness (715) up to about 6 millimeters. Thus, the Preparing Step (110) is essentially making continuous ribbons (1105) out of a material.

When wood is used for the material, typically a veneer will be made by shaving a log. Then, cutters (1115) would be used to cut the veneer into continuous ribbons. The wood grain (415) would be carefully observed. Spooling across the wood grain (415) would be difficult because of cracking. Also a layered object (405) will have a better appearance if the wood grain (415) runs parallel to the length of the continuous ribbon (1210).

More than one width of ribbon may be prepared so that ribbons of varying widths and lengths are deployed in the machine to make a three-dimensional product. Different widths (1110) of ribbons are not required, but are preferable because the use of larger and smaller widths together in the process minimizes dispensing and combining unwanted material in making the three-dimensional product. Thus, the plurality of continuous ribbons (1105) includes a plurality of different widths (1110).

An example of material formed in a continuous ribbon is a wood veneer that is sliced into ribbons. Alternatively, the ribbon material may be any other solid substance that can be formed into a ribbon. Accordingly, the method (105) may use more than one material in the process to make a product with varying looks and physical properties. The simplest embodiment of the method (105) involves one material, a first material (835), which is explained with reference to FIG. 1.

As with all such material in ribbon form, the first material (835) has a solid, natural state. This means that of the three states of matter, solid, liquid and gas, the material employed as a ribbon in the method (105) has a solid state without converting to powder or flour in the solid state and is not a liquid or a gas.

Optionally, a material, especially a veneer, will receive a surface treatment on one side (called the bottom surface (610)) with backing such as paper or synthetic fibers or using an adhesive (605) in the form of a glue lattice, or will receive a full coating of adhesive on the bottom surface (610). The choice would depend on the ultimate use of the raw material, the species of wood, and other factors related to spooling and transportation. The backed ribbon is preferably allowed to dry or be cured as needed to achieve the required tensile strength and to avoid cracking, snapping, and other damage during the spooling process. Backing would preferably be accomplished using veneer-backing machines, or with industrial glue applicators working in a continuous process to create a continuous ribbon (1210).

Any such backed material is preferably sliced into long continuous strips. The strips are then stacked in piles segregated first by species of wood, then sorted by thickness, and finally sorted by width of strips.

Splicing may be used to join one veneer piece with another veneer piece of the same thickness. For this part of the method, splicing may or may not be done along the long sides, in order to add width of existing veneer pieces. Splicing must be done however, along the short sides, to connect consecutive strips of veneer in order to increase the length of veneer into a ribbon form along the direction of the grain which can be formed into rolls on rolling machines.

Figure 10:
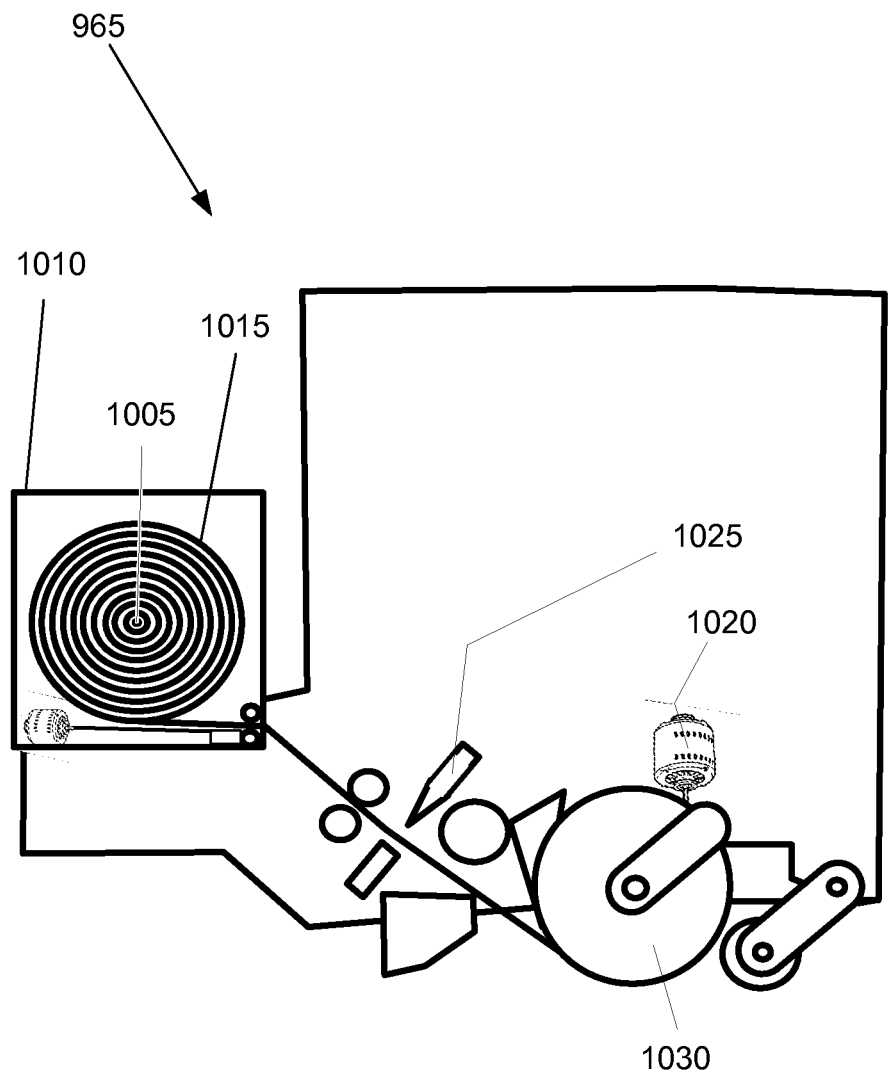
FIG. 10 is a side elevation view of a ribbon application head having components to apply lengths of continuous ribbon to make an object on the bed of the CNC machine.
Figure 11:
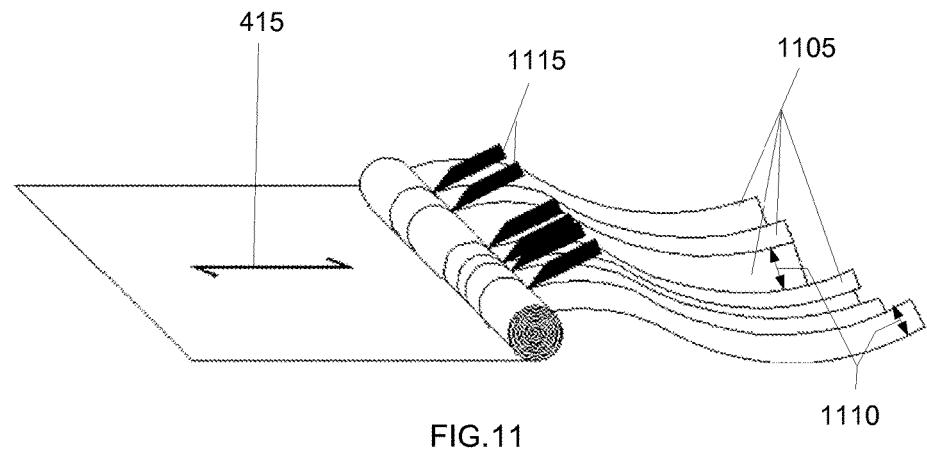
FIG. 11 is a perspective of a log of wood being shaved to produce a veneer that is subsequently cut into continuous ribbons in a variety of widths.
Figure 12:
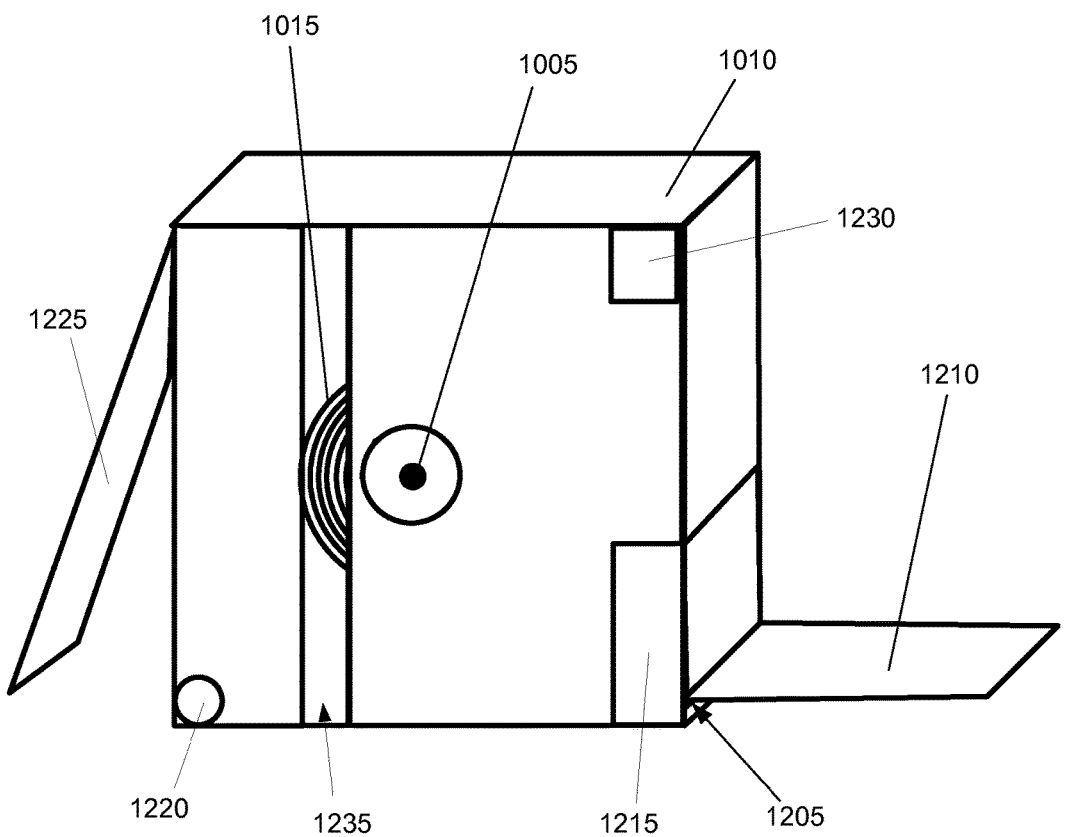
FIG. 12 is a perspective of an exemplary feeder cassette.
Figure 13:
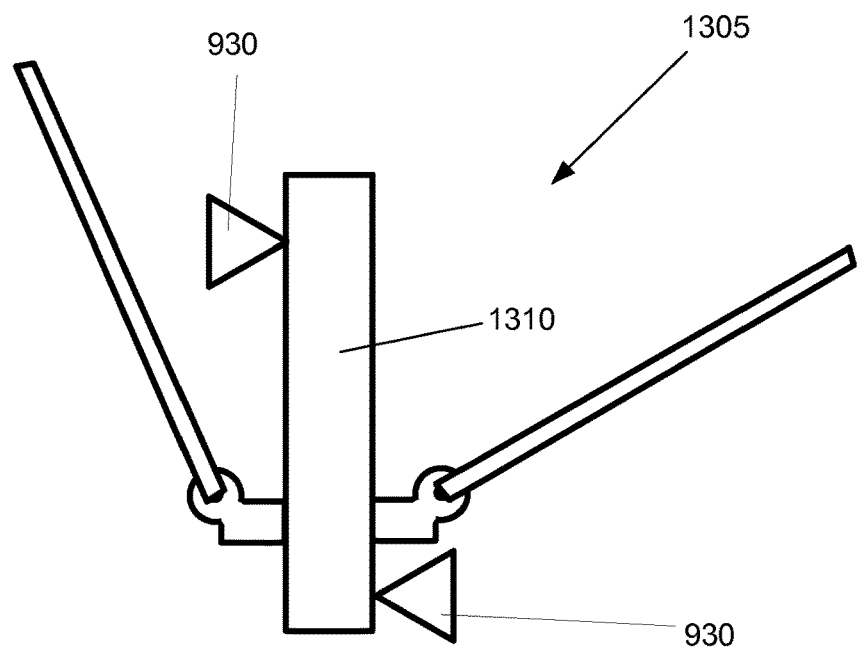
FIG. 13 is a side elevation view of an exemplary swivel mechanism employed to move a ribbon application head to a variety of locations on the CNC machine.
Figure 14:
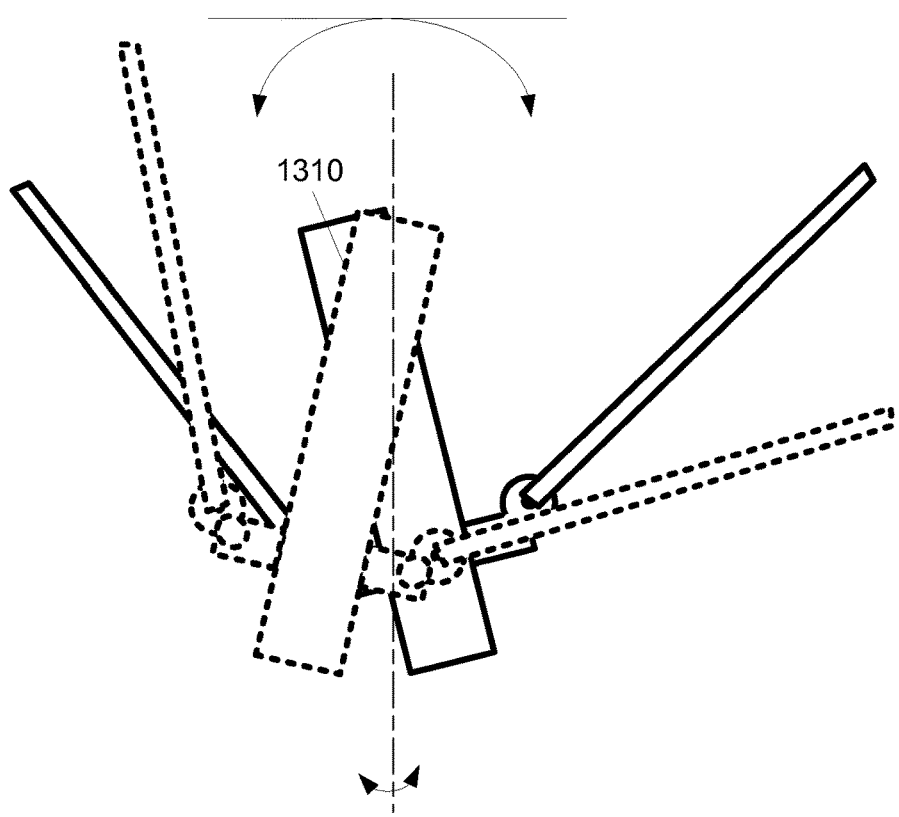
FIG. 14 is a side elevation view of the swivel mechanism of FIG. 13 illustrating motion.
Figure 15:
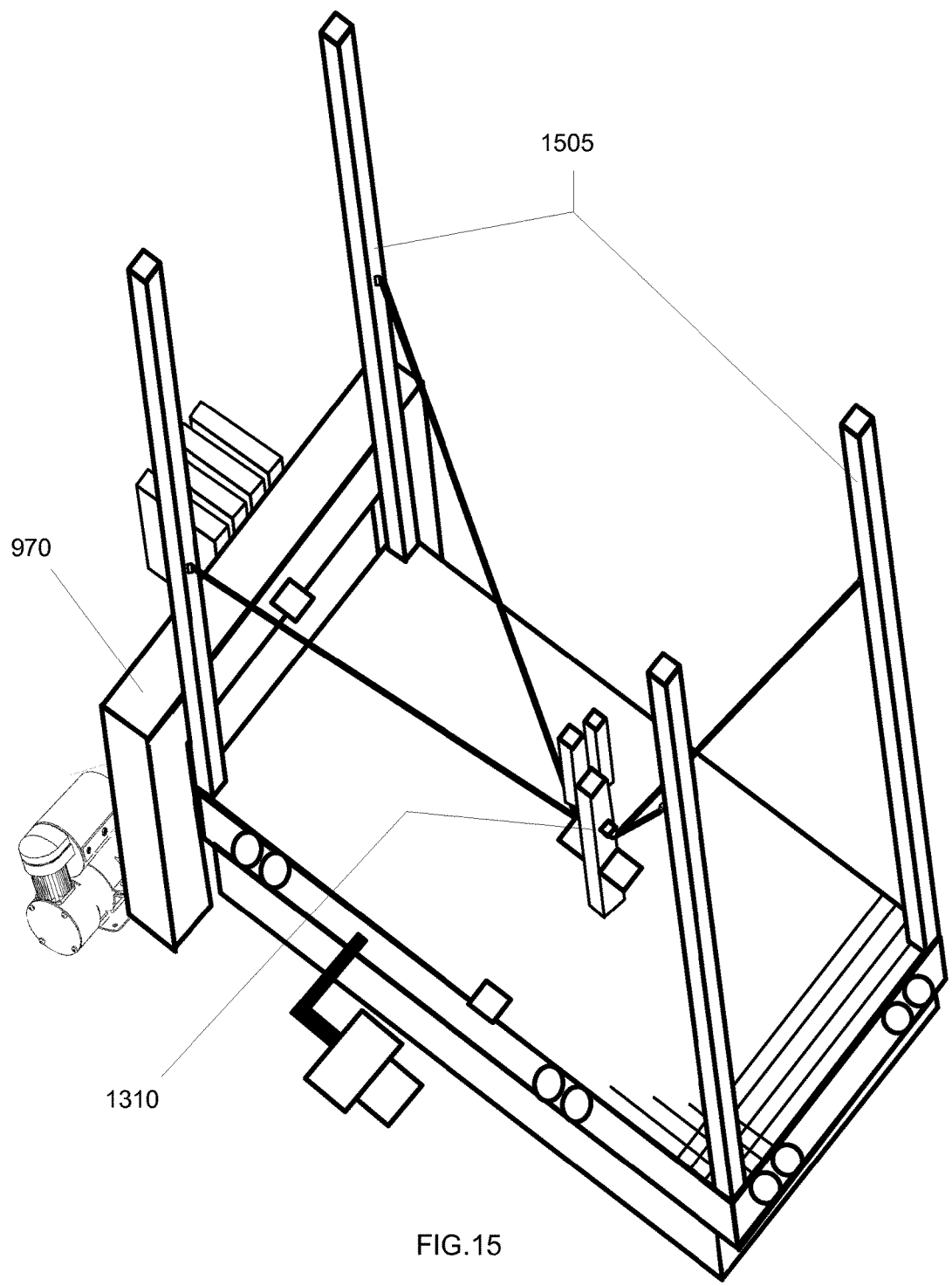
FIG. 15 is an alternate embodiment of CNC machine with added components for implementing the method illustrated in FIGS. 1 through 3.
Figure 16:
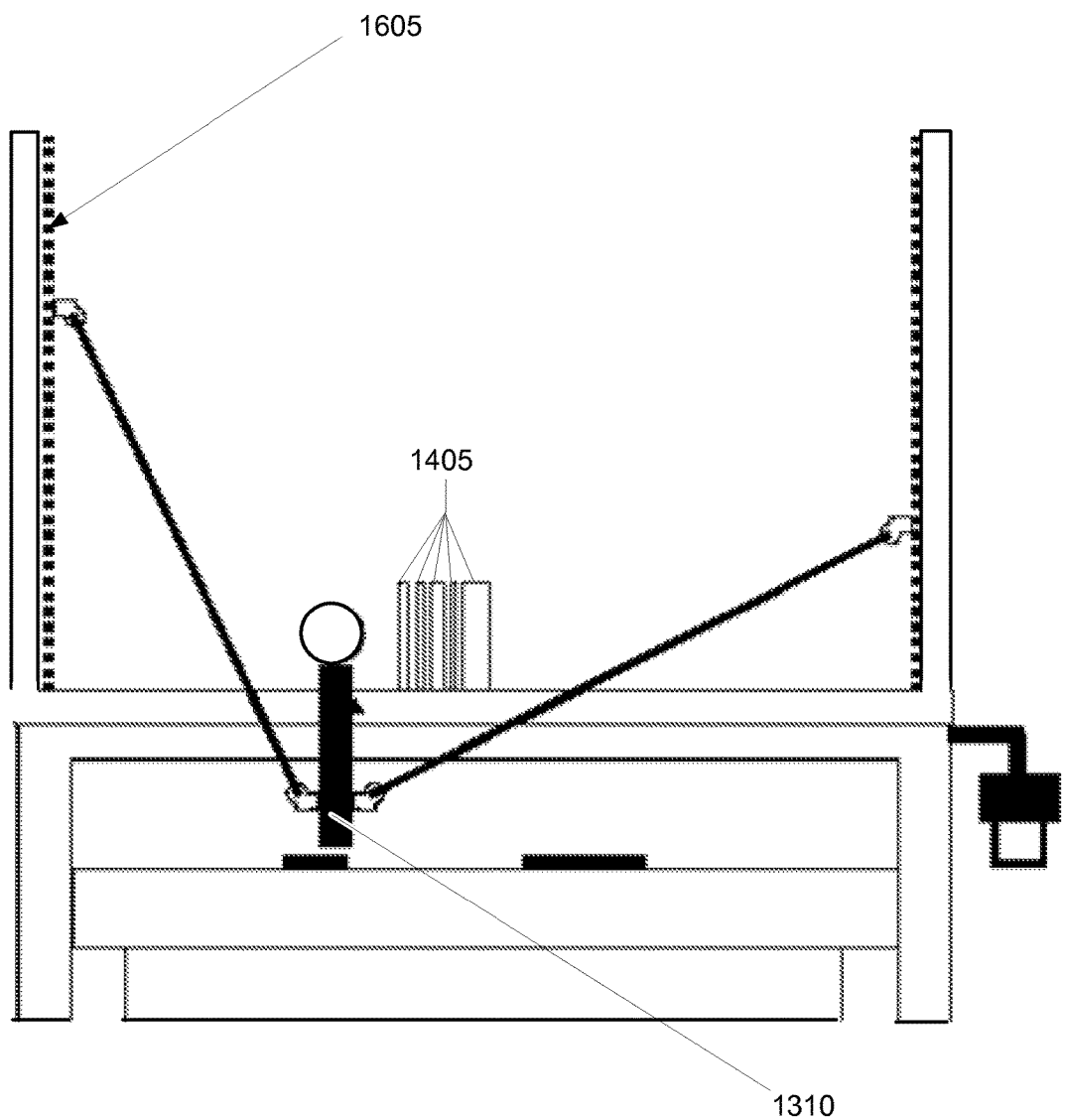
FIG. 16 is a second alternate embodiment of CNC machine with added components for implementing the method illustrated in FIGS. 1 through 3.

If splicing is done, for example to create wide rolls of veneer by joining along the long side and along the length, then stripping (creating a ribbon) may be done after splicing and after formation of long rolls of backed veneer. A machine may be used to convert the wide roll into narrower ribbons of uniform and/or random widths. The stripping done after spliced rolls are provided to the stripping machine is preferably a continuous process. A wide roll would be unrolled under sharp blades spaced at pre-set intervals, as shown in FIG. 10, to divide the unrolled material into narrower strips. The narrower ribbons would then be re-rolled separately in a continuous process.

The Rolling Step (115) includes rolling each continuous ribbon (1210) in the plurality of continuous ribbons (1105) onto a spool (1005) held within a feeder cassette (1010) so that each feeder cassette (1010) holds one roll (1015) of continuous ribbon (1210) and so that there are a plurality of feeder cassettes (1405). This step is also referred to as spooling. Each feeder cassette (1010) is essentially a box that holds a single roll of continuous ribbon (1210) on a spool (1005). The box may have a door (1225) to facilitate loading.

Spooling is a customized step for each width and for each species of, for example, veneer. Rolls of identical width and diameter will have different weight depending on the material, for example the species of wood. Similarly a wider ribbon of veneer will be heavier than an identical diameter roll of narrower ribbon. In other words, for cassettes to be manageable in weight and volume, as well as acceptable by the machine for dispensation of the ribbon strips, the spooling is preferably guided within parameters.

Preferably, a machine would either be designed or calibrated to accept a given weight range of the feeder cassette (1010). The total weight is preferably managed by human operators loading a plurality of feeder cassettes (1405) onto the machine, so it is anticipated that the weight of a feeder cassette (1010) is unlikely, in preferred instances, to exceed about 30 kilograms. That exemplary guiding weight could be used to determine how much continuous ribbon (1210) having a particular width should be spooled into feeder cassette (1010). Because there is likely to be a plurality of different widths (1110), the length of each continuous ribbon contained in a feeder cassette (1010) is likely to be varied.

Each feeder cassette (1010) is preferably configured to dispense continuous ribbon (1210) through a slit (1205) in said feeder cassette (1010). The slit (1205) is simply an exit port, which is necessarily larger than the thickness (715) and the width of the continuous ribbon (1210), through which the continuous ribbon (1210) is dispensed and cut to the length (810), as needed for the particular product being fabricated.

It is preferred that the feeder cassette (1010) is a container made of plastic or metal to house a spool of raw material. Preferably, the size of the feeder cassette (1010) will vary based on internal width to snugly fit the width of the spool of continuous ribbon (1210) being used, and will be high and deep enough to comfortably hold material such that the total weight remains within a preferred target weight of about 30 kilograms. Thus, the feeder cassette (1010) is likely to vary in size for each width of spooled continuous ribbon (1210) inside. For example a wider spool requires a wider internal width, and since the total weight may be a limiting factor, the height and depth of the feeder cassette (1010) or its internal spool of continuous ribbon (1210) could be adjusted accordingly.

Preferably, a feeder cassette (1010) would be sealed electro-mechanically after inserting the continuous ribbon (1210). Preferably, such sealing would be performed at a customized locking machine at the source of the raw material. Such a locking machine could be tasked with communicating with a central server, transmitting what material each feeder cassette (1010) was loaded with, when it was loaded, where it was loaded, etc. The feeder cassette (1010) would thus be locked using a locking mechanism and sealed to avoid tampering and dust incursion. When loaded onto the computer numerical control machine (905), any electronic sensors at the locking mechanism of the cassettes would preferably communicate and verify the seal before the continuous ribbon (1210) inside is dispensed. Any such sensor would preferably advise an electronic interface with the computer numerical control machine (905) of usability or rejection of that feeder cassette (1010) and its contents, based on pre-determined criteria such as weight, material, and length.

It is preferred that the feeder cassette (1010) comprises an electronic spool-monitor (1230) in communication with a processor of the computer numerical control machine (905) for the purpose of: i) relaying details in regards to the continuous ribbon (1210) contained within the feeder cassette (1010); ii) monitoring levels and other metrics of the continuous ribbon (1210); and iii) communicating via the electronic interface to a central server to trigger refilling and/or replacement. This sensor via the electronic interface may also advise supply sources via the central server each time a computer numerical control machine (905) is loaded with such a feeder cassette (1010), number of uses before servicing, etc. The feeder cassette (1010) is thus preferably accepted or not accepted by the computer numerical control machine (905) via control and safety systems that will conduct an electronic handshake, before any strips of continuous ribbon (1210) within the feeder cassette (1010) are dispensed from the feeder cassette (1010) by the computer numerical control machine (905). There is also preferably a viewing window (1235) of clear plastic or polycarbonate, along the side of the feeder cassette (1010) for visual monitoring of the levels of continuous ribbon (1210) inside the feeder cassette (1010).

In one aspect, the cassette may be considered a rectangular box-like shape overall, with required customization to achieve the precise shape of its shell for utility purposes. Such customization might include crimps, folds, buttresses, and bulges required for the feeder cassette (1010) to dock with the computer numerical control machine (905) and for the feeder cassette (1010) structural integrity. The feeder cassette (1010) may have a feed-out mechanism to let material out of the slit (1205), preferably located closer to one corner of the feeder cassette (1010) on one of the sides of the feeder cassette (1010). The slit (1205) may have a specialized adjustment mechanism to suit the different thicknesses of continuous ribbon (1210).

Preferably, the feeder cassette (1010) may have an auxiliary ribbon-extraction mechanism that can be employed manually if the continuous ribbon (1210) breaks during dispensing or otherwise withdraws from the slit (1205). Such an auxiliary ribbon-extraction mechanism would also serve a security and monitoring purpose- to avoid tampering of the raw material for quality control of production and monitoring of repetitive flaws in either the feeder cassette (1010) or the continuous ribbon (1210) inside, or improper operation of the computer numerical control machine (905) itself. Instead, special software may be built into the computer-aided manufacturing instructions to control a manually-supervised extraction of the broken continuous ribbon (1210) by turning the spool (1005) by the computer numerical control machine (905), in much slower and limited extent—enough to conduct extraction and re-calibration.

Calibration and re-calibration of a feeder cassette (1010) would preferably be done when a feeder cassette (1010) is mounted onto the engagement dock (910) of computer numerical control machine (905). Such calibration and re-calibration would then be part of the electronic handshake. Such calibration and re-calibration would preferably include drawing the continuous ribbon (1210) to a point precisely controlled by the computer numerical control machine (905) for dispensing the continuous ribbon (1210) and for ensuring relevant components of the computer numerical control machine (905) recognize the thickness (715) and width (1110) of the continuous ribbon (1210). Other security guidelines would preferably form part of the software, even if they relate to operation of the feeder cassette (1010).

The feeder cassette (1010) may have RFID sensors for logistic management and shipping. It may also have other components like a built-in cutting mechanism (1215), for example near the slit (1205), LED lights for visibility inside the feeder cassette (1010) or outside it, and additional rollers for smooth extraction.

The Loading Step (120) includes loading each feeder cassette (1010) in the plurality of feeder cassettes (1405) onto an engagement dock (910) of a computer numerical control machine (905). Fabrication of a layered object (405) using the method (105) of stratified additive manufacturing is preferably performed on a computer numerical control machine (905), which is known as a CNC machine. A digital specification for fabricating each layered object (405) is programmed on the computer numerical control machine. Preferably, a plurality of feeder cassettes (1045), each holding a spooled continuous ribbon of a different width, are attached to the CNC machine above the bed (925) in the engagement dock (910), which is essentially a mechanism holding the feeder cassette (1010) so that lengths of ribbon can be dispensed to build the layered object (405).

The Dispensing Step (125) includes dispensing above the computer numerical control machine (905) a first portion (805) of continuous ribbon (1210) from a first feeder cassette (950) in the plurality of feeder cassettes (1405) while preserving the solid state of the first portion (805). Thus, a length of continuous ribbon (1210), a first portion (805), is dispensed above the bed (925) of the computer numerical control machine (905). The appropriate length of the first portion (805) is determined by the digital specification programmed on the computer numerical control machine (905). At no time during the Dispensing Step (125) or any other step in the method (105) does the material formed as the continuous ribbon (1210) change states, which means that it does not change from its solid state to a gas or a liquid to produce the layered object (405). Necessarily, the requirement of the material being continuous ribbon also means that the material is not another solid state such as a powder nor is it in particle form. Preferably, dispensing is accomplished by rotating and laying each length of ribbon in a position that builds to the final shape of the layered object, so as to minimize later shaping or cutting off of excess ribbon.

Figure 8:
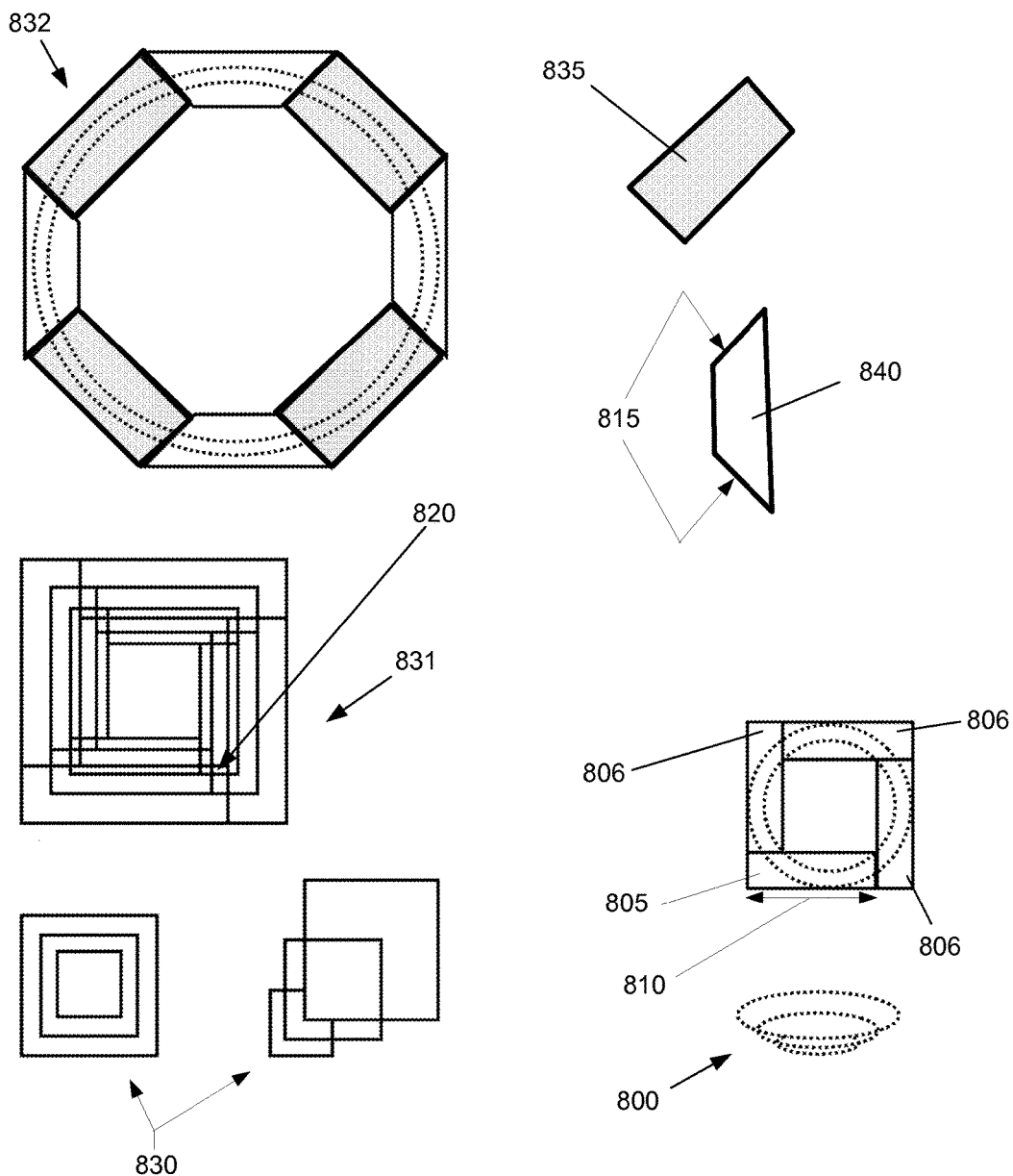
FIG. 8 is an illustration of application of cut ribbon applied to make a bowl.
Figure 9:
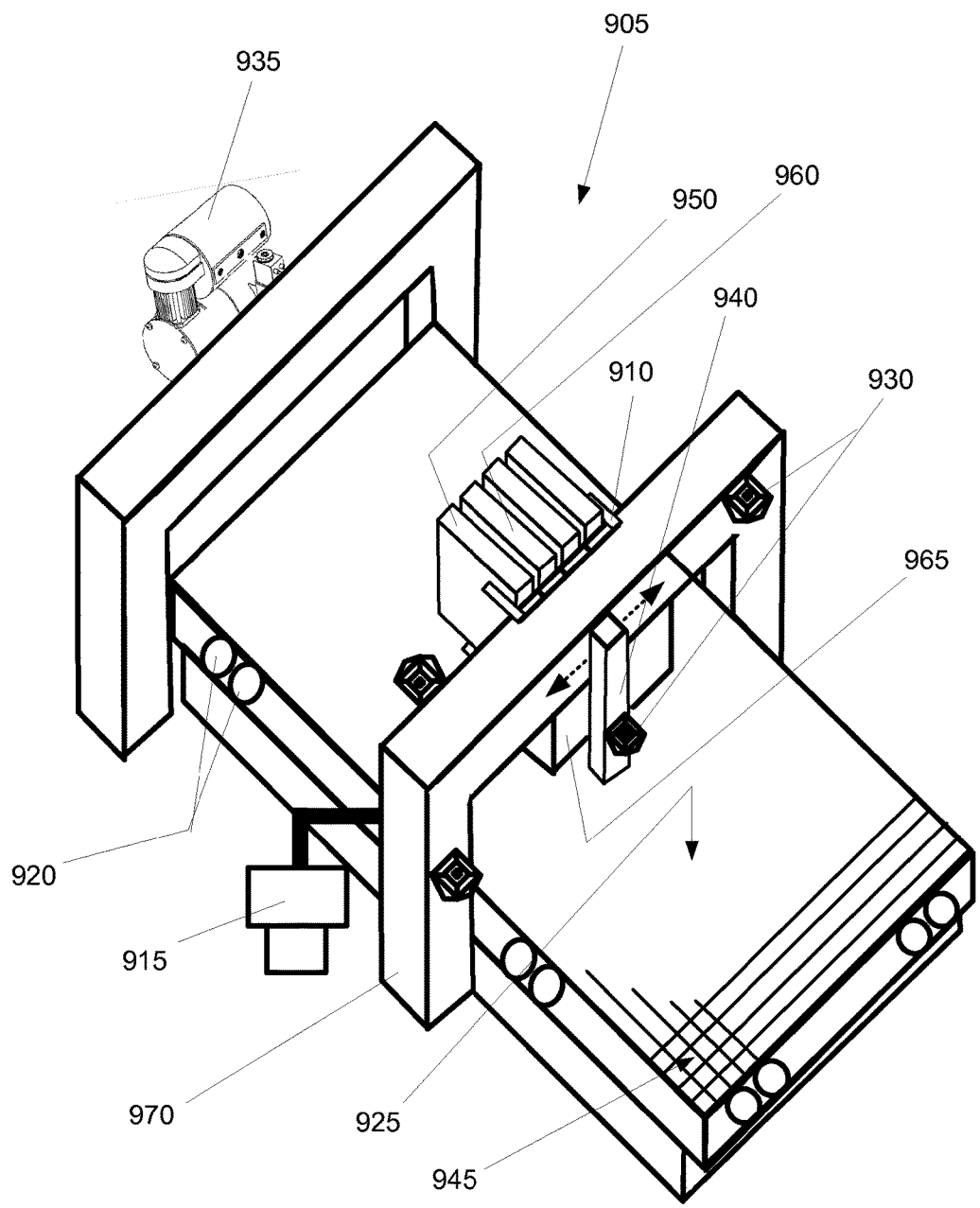
FIG. 9 is a perspective of a CNC machine with added components for implementing the method illustrated in FIGS. 1 through 3.

The Cutting Step (130) includes cutting the first portion (805) to a length (810) and having an end profile (815) as directed by digital specification programmed on the computer numerical control machine (905). The end profile (815) may be a slanted edge as shown in FIG. 8, or it may have a bevel or be cut at any desired configuration. Once cut, the first portion (805) is laid on the bed (925) at a location as determined by the digital specification programmed on the computer numerical control machine (905). Further manipulation of portions or strips of continuous ribbon (1210) may take place and be enabled by manipulation modules attached to the computer numerical control machine (905). These may include additional cutting to shape and cutting to size using any manner of blades, knives, lasers, and milling cutters.

The Creating Step (135) includes creating a layered object (405) by dispensing, cutting and applying additional portions (806) of continuous ribbon (1210) from one or more feeder cassettes in the plurality of feeder cassettes (1405) where each of the additional portions (806) has a butt joint (520) with a previously dispensed portion or is added atop the previously dispensed portion in accordance with the digital specification programmed on the computer numerical control machine (905). The Creating Step (135) is preferably performed by maximizing application of the additional portions (806) at any angle within 360° across the X-Y coordinates so as to create the layered object (405) in its final state to the maximum extent practical, thus minimizing the need for subsequent work on delivering the product (800) in its final shape.

Applying includes any transportation of the first portion (805) or additional portion (806) around the computer numerical control machine (905) operational areas, preferably by a ribbon application head (965).

The Weaving Limitation (205) states that the additional portions (806) of continuous ribbon (1210) are dispensed so that any butt joint (520) is covered by a next layer applied atop the butt joint (520) so as to form a woven connectivity (820). In other words, the butt joint (520) is covered by an additional portion of material laid atop the butt joint (520) so that the butt joint (520) is reinforced by that additional portion.

Example of Woven Connectivity

This example is a description of layered building, which specifically indicates measured strips and their overlaps, which are chosen for a) optimized use of material (via measured use of width and length); and b) strength via an overlap. This example illustrates how an object having non-rectilinear sides can be built out of straight lengths of strips of ribbon without having to carve out of large blocks or chunks of material. The product (800) shown in FIG. 8 is a bowl. All the layers indicated in FIG. 8 are of 1.00 mm thick veneer. The bottom three layers (830) of the bowl are small enough to be single pieces. In this example these bottom three layers (830) are the bottom 3.00 mm of the wooden bowl. These bottom three layers (830) are three square pieces stacked to be eventually milled into their final round shape. This example shows that veneer pieces may be narrow or wide and up to 300 mm in width. Layers 4, 5 & 6 (831) are made of multiple pieces. Layers 7 and above (832) show the process expanding with successive levels to accommodate a larger diameter product. The dotted lines of the product (800) show the bowl in its final milled shape.

The Selecting Step (210) is an added limitation that involves selecting the first material (835) from the group consisting of wood veneer, metal, plastic, cork, leather, fabric, fiber and any combination of these. Thus, the material may be any combination of solid materials susceptible to being formed as a continuous ribbon (1210).

Wood veneer or simply "veneer" may be described as shaving of fine layers of wood from the surface of a tree (log) or from blocks (slabs of wood). This material is extracted from the larger pieces (logs or slabs) with almost no wastage due to the shaving process. Veneer is generally in lengths as achieved by the veneer shaving machine, and in lengths as long as physically possible to produce, using existing conventional machinery.

Veneer is preferably stabilized for humidity, shrinkage, etc. following existing conventional processes, and made available for the pre-spooling step of the present invention in the form of sheets or flitches as may be the case. At this point veneer might be shaved in any variety and combination of thicknesses commonly up to 1.2 mm but usually with a maximum thickness up to about 3.0 mm. Batches of prepared veneer require that they be segregated by thickness. It is preferred that the veneer prepared for use in the method of the invention is also made consistent for thickness as required using precisely calibrated equipment, and sanding or smoothing as required.

The Adding Step (215) first defines that each continuous ribbon (1210) comprises a top surface (705) and a bottom surface (610). The Adding Step (215) then includes a step of adding an adhesive (605) to said bottom surface (610). The adhesive (605) may be added in any way found practical and not just by applying it to the bottom surface of each additional portion. For example, glue may be painted on the already dispensed portions and a dry additional portion laid atop the glue. The terms "glue" and "adhesive" are used interchangeably herein and are intended to be interpreted broadly. For example, the adhesive (605) may include organic or inorganic materials, natural or synthetic, acting for and intended for a permanent bond between two consecutive layers of portions or strips of continuous ribbon (1210). Adhesion may be accomplished using physical or chemical means in any number of steps. For example, it may include applying mixing of chemical bonding agents in-situ, or activation of pre-applied adhesive by heat, heated air, chilling or refrigerating, ultrasound, infrared light, ultraviolet light, and laser light. The choice of material for the continuous ribbon (1210) and the adhesive (605) will dictate any activation methods of the adhesive (605).

The Attaching Step (220) first defines that each continuous ribbon (1210) comprises a top surface (705) and a bottom surface (610). The Attaching Step (220) then includes a step of attaching a radio-frequency identification tag (615) to the bottom surface (610). Thus, an RFID tag can be incorporated into the body of the layered object (405).

Preferably, electronic tagging of the ribbon by embedding such RFID tags on the bottom surface (610) is performed during any gluing and backing process. Such RFID tags may incorporate information about the ribbon and its origin. Nano-particles appropriate for this function may replace larger RFID tagging via a spray-on method during preparation.

The Spraying Step (225) includes spraying at least one continuous ribbon (1210) in the plurality of continuous ribbons (1105) with particles (710). The particles (710) may be something useful to add to the preservation or function of the layered object (405) or to its color or other appearance feature. For example, the particles (710) are selected from the group consisting of an electrical conductor, an electrical insulator, a paint, a dye and a pigment, a chemically reactive agent; and a penetrant.

The Milling Step (230) includes milling the layered object (405) prior to completing the action of dispensing, cutting and applying additional portions (806) of continuous ribbon.

The Milling Step (230) may be performed on the computer numerical control machine (905) using a milling head (940), so as to more quickly prepare the product (800) that is prepared from the layered object (405).

The Second Preparing Step (305) and the several steps that follow involve a second material (840) interspersed with the first material (835) when making the layered object (405). The steps involving the second material (840) are similar to those involving the first material (835) and are briefly repeated for clarity.

The Second Preparing Step (305) includes preparing a continuous ribbon of second material (840), said second material (840) having a solid state, the second material (840) being different from the first material (835).

The Second Rolling Step (310) involves a second material (840) to be added to the layered object (405). It is similar to the Rolling Step (115), described above. The Second Rolling Step (310) includes rolling the continuous ribbon (1210) of second material (840) onto the spool (1005) held within a second feeder cassette (960) so that the second feeder cassette (960) holds one roll (1015) of continuous ribbon (1210) of second material (840);

The Second Loading Step (315) includes loading the second feeder cassette (960) holding continuous ribbon (1210) of second material (840) onto the engagement dock (910) of the computer numerical control machine (905).

The Second Dispensing Step (320) includes dispensing onto a previously dispensed portion a measured length of such continuous ribbon (1210) of second material (840) through the slit (1205) in said second feeder cassette (960) while preserving the solid state of the second material (840).

The Second Cutting Step (325) includes cutting the measured length to the end profile (815) directed by digital specification programmed on the computer numerical control machine (905).

The product (800) produced by the method (105) using a second material includes layers (410) of first material (835) and at least one layer of second material (840). In all such respects, each layer is made of a first material (835) or a second material (840) having a solid state and not a liquid or gaseous state. The requirement of the material being continuous ribbon also means that the material is not a powder, nor is the material in particle form.

The product (800) produced by the method (105) using only one material, such as only a first material (835) includes layers (410) of such first material (835) that are also in a solid state and not in a liquid or gaseous state.

An apparatus for the practice of the method (105) includes a computer numerical control machine (905), an engagement dock (910), a ribbon application head (965), a motor (1020), and a blade (1025).

The computer numerical control machine (905) includes a bed (925) upon which the fabrication of the layered object (405) takes place. As with all such CNC machines the computer numerical control machine (905) operates by digital specification programmed on the computer numerical control machine (905). The computer numerical control machine (905) is operable to position the first portion (805) of continuous ribbon (1210) and the additional portions of continuous ribbon (1210) according to the digital specification.

The computer numerical control machine (905) preferably operates using electronic interfacing and monitoring. Such electronic interfacing and monitoring would preferably include all hardware and software dedicated to controlling and monitoring the activity of the computer numerical control machine (905), communications with servers, visually recording production and operation, and, controlling any ancillary devices and extensions added to the computer numerical control machine (905). The electronic interfacing and monitoring components of the computer numerical control machine (905) could be replaced, augmented, and upgraded for maintenance or improvement or for refined control as needed without affecting the fundamental nature of the computer numerical control machine (905) and its physical or chemical activity. There are inherent and standardized aspects in any computer numerical control machine, namely: capability for using computer aided design and computer aided manufacturing (CAD/CAM) software, control devices, and monitoring, display and interaction systems.

CAD/CAM software refers to any customized software created to suit the fundamental nature of the computer numerical control machine (905) and its described operations. This preferably includes special encryption-decryption software operable on the computer numerical control machine (905).

The computer numerical control machine (905) includes operational control devices that implement the software. Such operational control devices would typically include any software processors in the form of hardware a) either functioning individually on the machine or collectively used on a motherboard, or b) on independent computing units while forming part of the computer numerical control machine (905) itself.

The preferred computer numerical control machine (905) includes an electronic control unit (915) that permits control of video cameras (930), video monitoring, display and interaction with the computer numerical control machine (905). The electronic control unit (915) would preferably include monitors (screens) to for human interaction with the computer numerical control machine (905) in order to receive information and provide instruction to the computer numerical control machine (905), and also to observe activity performed when implementing the digital specification programmed on the computer numerical control machine (905). Such monitors could be non-computing screens and projection films, or stand-alone computing devices like tablets. The video cameras (930) or still cameras would preferably be mounted on the computer numerical control machine (905) to view and calibrate the computer numerical control machine (905).

Preferably, the electronic control unit (915) and the components with which it interfaces would enable remote diagnostics and supervised maintenance of the computer numerical control machine (905).

Preferably, the electronic control unit (915) enables operability of remote interaction systems to control the computer numerical control machine (905). Any such remote interaction systems would preferably be accessible and controllable from a remote server. Hardware and software is also preferably controllable at the computer numerical control machine (905). However, it is preferably to enable the overriding control of the computer numerical control machine (905) from the remote server. Such overriding control would preferably include operation of master trip switches, feeder cassette (1010) controls, video cameras (930) and activity recorders, transmitting devices, and diagnostic software. It is preferable if any diagnostic software function and operation could be initiated and controlled by the remote server also enabling overriding any instruction to be implemented via video monitoring, display and interaction units.

Preferably, the computer numerical control machine (905) software includes maintenance guidance systems, which would be used by technicians and administrators to receive maintenance instruction via video monitoring, display and interaction units or initiate inquiry for anticipated future maintenance requirements. Such software would preferably interact with consumable tools used by the computer numerical control machine (905) and would monitor wear-and-tear, amount of use, precision of performance, accuracy of parts replaced. While this software would preferably not override operation, it would preferably communicate with the remote server for authorization and receive the same before sending a permission to operate to the components operated by the electronic control unit (915).

Other preferred components of the computer numerical control machine (905) include logistic support software and customer relationship management (CRM) and enterprise resource planning (ERP) software. CRM and ERP software are a category of enterprise software that covers a broad set of applications and software to help businesses manage customer data and customer interaction, access business information, automate sales, marketing and customer support.

The computer numerical control machine (905) would also typically include other computing devices and one or more memory units, motherboards, and hard drives. In addition, specific cables and data communication wires, transmitting units such as modems, blue-tooth modules, and wireless signal receivers would typically be included.

The engagement dock (910) is a bracket suited for retaining the plurality of feeder cassettes (1405) in a position above the bed (925) while the continuous ribbon (1210) is dispensed from the feeder cassette (1010).

The ribbon application head (965) guides the application of each strip (first portion (805) or additional portions (806)). When required, the ribbon application head (965) moves into position to withdraw the continuous ribbon (1210) and guide the continuous ribbon (1210) for cutting to end profile and applying the strips at any horizontal or vertical location so as to complete every applicable layer of the layered object (405). Vertical movement above the bed (925) may be directed as well as vertical movement of the ribbon application head (965) to provide optimum movement of the strip for application. Thus, after all layers for every layered object (405) are applied at the same level, Z-Axis (vertical) movement for the bed (925) of the computer numerical control machine (905) or the ribbon application head (965) will take place equal at least to the thickness of the next layer to be applied and the process will continue so on and so forth up to completing the layered object (405).

The ribbon application head (965) may be used for completing more than one object simultaneously on the bed (925) of the computer numerical control machine (905).

The motor (1020) is the powering device for the ribbon application head (965). A second motor within the feeder cassette (1010) may also be used to feed the continuous ribbon (1210) out of the feeder cassette (1010). Thus, the motor (1020) is configured to dispense the first portion of continuous ribbon (1210) from the feeder cassette (1010) said motor (1020) responding to control by the digital specification.

The blade (1025) is what cuts the continuous ribbon (1210) into portions for application on the bed (925) of the computer numerical control machine (905). The blade (1025) is configured to cut the first portion (805) of continuous ribbon (1210) and the additional portions (806) of continuous ribbon (1210) each to the length (810) and having the end profile (815) directed by the digital specification.

The apparatus for the practice of the method (105) implements steps related to creation of layers from strips of dispensed continuous ribbon (1210). The activities performed by or on the bed (925) of the computer numerical control machine (905) coordinate activities that might be described as application plus additive layered manufacturing plus micro-lamination. Stratified additive manufacturing is also referred to as "layering" and when done on the apparatus for the practice of the method (105), such layering occurs by controlling where the Dispensing Step (125) and the Creating Step (135) take place in the X-Y-Z axes on the computer numerical control machine (905). In this process, the entire object takes its near-final shape in accordance with the digital specification programmed on the computer numerical control machine (905).

Example of Machine Operation

The following is an example of one embodiment of the apparatus and the method (105) disclosed herein.

The computer numerical control machine (905) that is part of the apparatus for the practice of the method (105) receives computer-generated instructions to select material for application.

This material is available as continuous ribbons in a variety of widths, each width in its own feeder cassette (1010) that makes the continuous ribbon (1210) within available for dispensing.

The computer numerical control machine (905) guides the human operator via video monitoring, display and interaction units to load the required plurality of feeder cassettes (1405) in the engagement dock (910) of the computer numerical control machine (905). The computer numerical control machine (905) keeps track via an electronic handshake of the location of each feeder cassette (1010) with its continuous ribbon (1210) of specific width so that the correct material is in place for use.

The plurality of feeder cassettes (1405) informs the computer numerical control machine (905), any human operator and the remote server of the variety and quantity of material available within the plurality of feeder cassettes (1405).

The computer numerical control machine (905) may request a changed or additional feeder cassette to complete the production at any stage of production.

The continuous ribbon (1210) is extracted by the computer numerical control machine (905), cut, shaped, and readied for layering. This involves selecting the correct feeder cassette so that the correct variety of material may be dispensed with the right width and the right thickness in accordance with the digital specification programmed on the computer numerical control machine (905) for the layered object being fabricated.

The strip or portion of continuous ribbon (1210) is readied for bonding including selecting the right process for gluing and either applying an adhesive (605) or activating the adhesive already on the underside or bottom surface (610) of the continuous ribbon (1210).

If gluing is done in-situ, then the adhesive (605) is dispensed in the appropriate manner and consistency on to the continuous ribbon (1210) from a computer-controlled vat or hopper also attached to the computer numerical control machine (905), or from a series of vats or hoppers if chemicals need pre-mixing before application.

After each strip or portion is applied, the ribbon application head (965) retreats and obtains the next strip to be applied, and so on and so forth up to completing every applicable layer of the layered object (405).

If more than one layered object (405) is being produced simultaneously on the bed (925) of the computer numerical control machine (905), then the ribbon application head (965) continues to apply the strips to fabricate each layered object (405).

After all layers for every layered object (405) are applied at the same level, Z-Axis (vertical) movement for the bed (925) of the computer numerical control machine (905) or the ribbon application head (965) will take place equal to the thickness of the next layer to be applied and the process will continue so on and so forth up to completing the layered object (405).

Example of Stratified Additive Manufacturing

The following is an example of one embodiment of the apparatus and the method (105) disclosed herein. The exemplary process involves building layers of material upon each other.

The ribbon application head (965) is guided to transport precise strips of continuous ribbon (1210) of: different widths, materials, species, thickness, lengths, leading shapes, and ending shapes.

A digital specification programmed on the computer numerical control machine (905) is the software control and design that determines what material will precede or follow each layer. Individual or multiple pieces of the continuous ribbon (1210) chosen will be placed and glued into place including any pressing (micro-lamination) such that a solid object is built up with successive layering.

The strip of continuous ribbon (1210) is located, and aligned as required, in the X-Y-Z axes precisely using the electronic control unit (915) to move the ribbon application head (965). This is undertaken by mechanisms very similar to conventional and existing technology used by edge-banding machine heads, rollers and applicators. The digital specification programmed on the computer numerical control machine (905) activates or applies the adhesive (605) and cures it rapidly.

The digital specification programmed on the computer numerical control machine (905) guides and moves the ribbon application head (965) and other application beam (1310) to precisely controlled locations in three dimensions via movable devices like a gantry (970), a vertical gear rack (1605) or pillars (1505).

A swiveling mechanism (1305) rotates the application beam (1310) as directed by digital specification programmed on the computer numerical control machine (905) to further position the strips of continuous ribbon (1210) into accurate positions.

The bed (925) of the computer numerical control machine (905) may be rigid or movable to further synchronize the location of the ribbon application head (965) into the accurate position as directed by digital specification programmed on the computer numerical control machine (905).

The computer numerical control machine (905) may accommodate the additive layered manufacturing of multiple objects, of varying shapes and sizes, in different materials or species, done simultaneously, over different parts of the bed (925). The activity of the computer numerical control machine (905) for all these objects produced simultaneously will be controlled via the same digital specification programmed on the computer numerical control machine (905).

Layering yields objects of simple or complex shapes that have a voxellated profile in cross-section. The cross-section is therefore just slightly larger at any point than the final required shape and size which can subsequently be milled and sanded down to its final shape and size.

Figure 5:
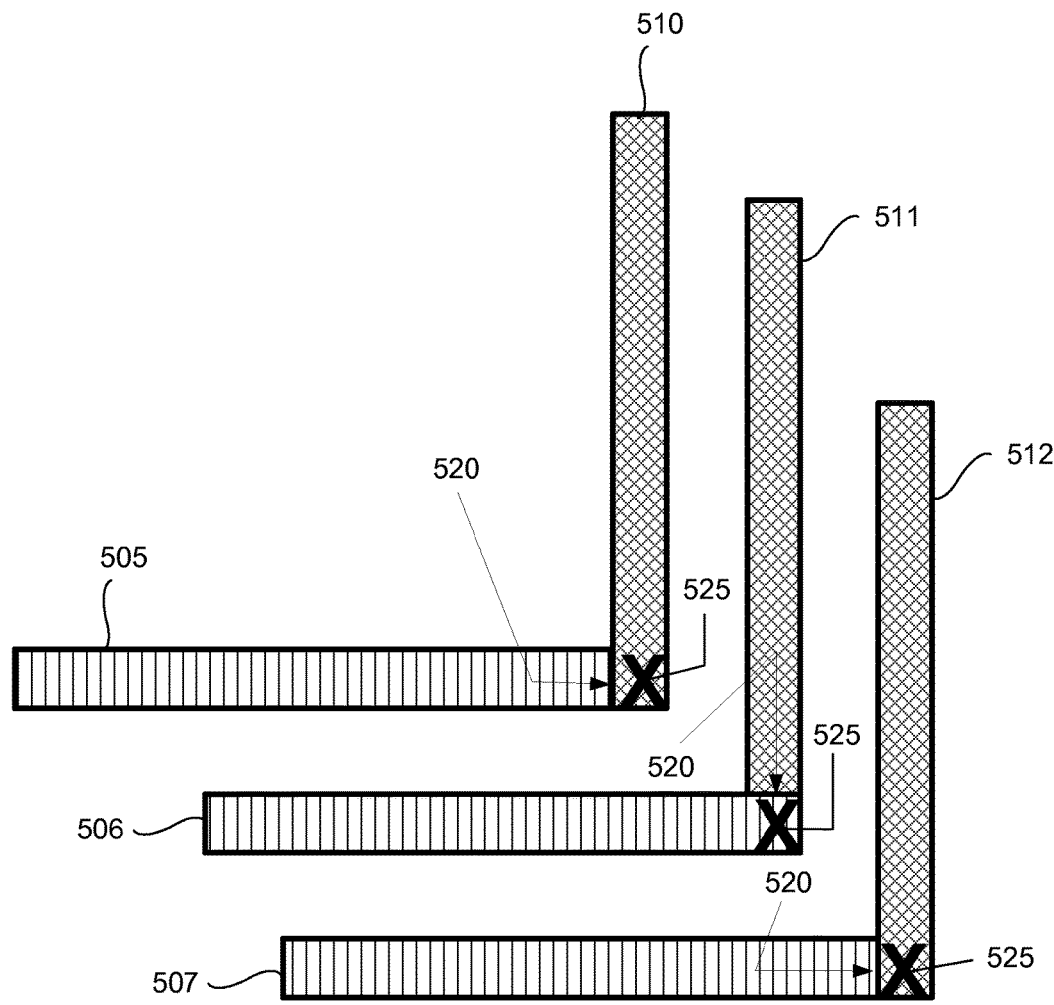
FIG. 5 illustrates butt joints of cut lengths of continuous ribbon.
Figure 6:
FIG. 6 is a top view of a length of ribbon showing adhesive and an RFID tag applied to its bottom surface.
Figure 7:
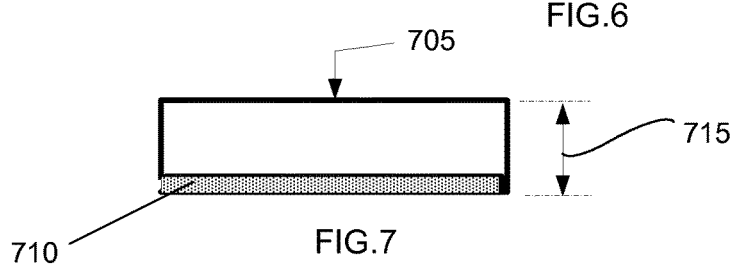
FIG. 7 is an end view of a ribbon showing a coating of particles on the bottom surface of the ribbon.

Weaving is undertaken in layering when strips of continuous ribbon (1210) overlap in a manner of criss-crossing paths in consecutive layers so as to weave "joints." In cases of framed objects, alternate layers of material will carry through to form a woven connectivity shown in FIG. 5. For example, strip A (505)—layer 1 ends at Strip B (510)—layer 1; strip B—layer 2 (511) ends at strip A—layer 2 (506); and Strip A (507) ends at Strip B (512) in layer 3 on top of layer 2. This crack overlay process repeats alternating layer-by-layer until the entire corner joint (525) shown by X is woven by layering rather than conventional joinery of two separate components requiring assembly.

Micro-lamination of layers already applied takes place simultaneously, and the process continues until each layered object (405) is completed. Micro-lamination is a series of lamination steps undertaken to yield a final laminar cross-section of an object as a whole. It includes the term "micro" only in as much as the individual strips of material being laminated form a tiny portion of the total object being created. Lamination is pressing of one layer upon a lower layer. Lamination may be achieved with or without the aid of the bed (925) or a network of rollers (920). In other words, the bed (925) may remain stationary without any other functions performed, or the bed (925) may participate in the lamination process via the network of rollers (920) and other controls.

Figure 4:
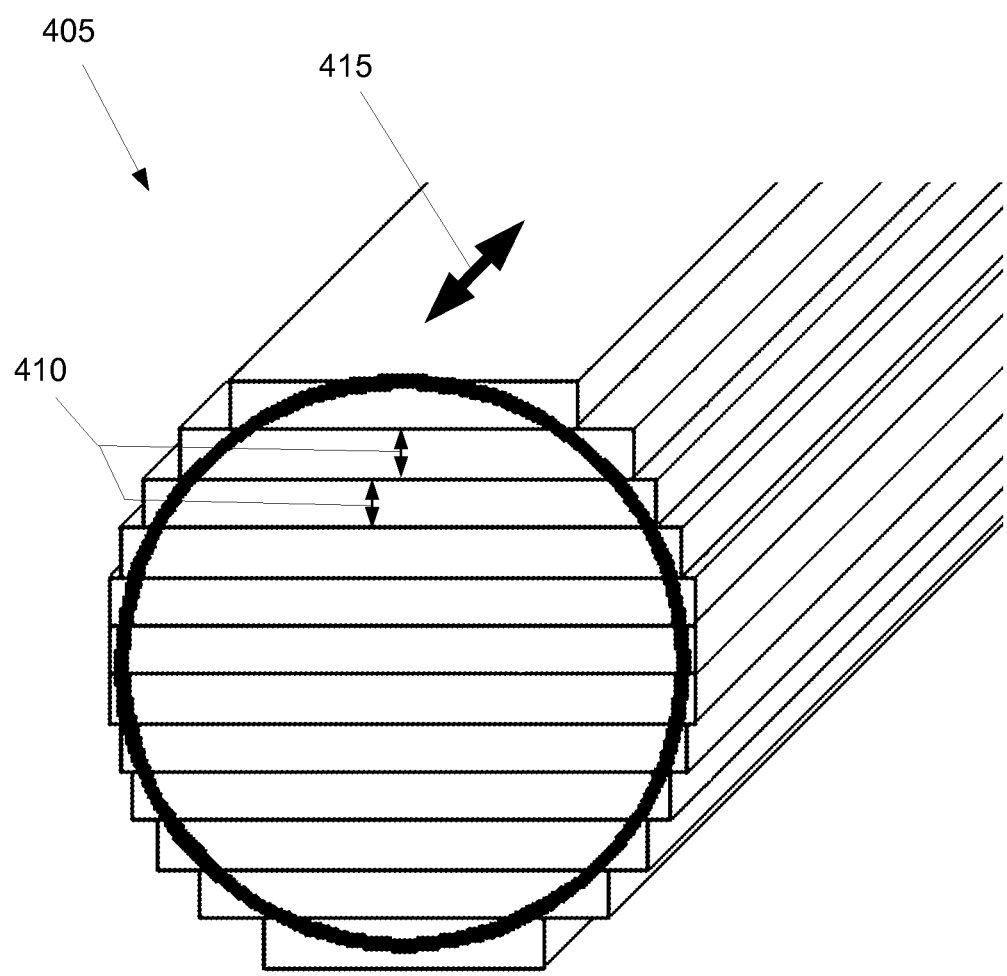
FIG. 4 illustrates a layered object manufactured with the method of the invention.

FIG. 4 illustrates a layered object (405) that is a batten of wood having a round cross-section of 5 millimeters (mm) diameter and a length of 60 centimeters (cm). Such a batten would otherwise have to be conventionally milled out of a piece which is at least 5.25 mm square and at least 65 mm long, typically using a lathe. All material of the cross-section outside the finished round batten needs to be eroded and milled out to leave the required finished size in place.

In the layered manufacturing process, the width of layers building the piece is chosen via a computer algorithm and optimized so that resulting final shape is a 'digitized version' of a round profile and each layer protrudes a little outside the circular profile. This way all the conventionally wasted material is saved and only a tiny amount needs to be milled away for the finished dimensions. Also, the length of the batten need not be longer for lathe machining and only slightly larger than the 60 cm length to allow final milling.

Layering does not yield the final shape precisely and must be followed by a milling, trimming, cutting, or shaving action required to complete the process. These finishing methods are conventional computer numerical control activities. Post-production computer numerical control milling may be desired, as an optional part of the computer numerical control machine (905) using a milling head (940).

Once a second layer is applied in building the object, pressing or bonding takes place to ensure fixing of the second layer to form a monolithic object. Each object, or variations of overall requirements, might determine one or more methods to press the layers together.

In the present example, pressing the layers together is by a roller (1030) on the ribbon application head (965). The roller (1030) is used as part of applying and rolling over an applied strip of material. This is done in a localized fashion upon the strip of continuous ribbon (1210) just applied. The rollers move with the ribbon application head (965) and are part of its total mechanism. This is done when the ribbon application head (965) can exert sufficient pressure for a particular adhesive to ensure bonding with the layer below it. The roller (103) in this example is removable if not required in a particular process, such as for example, if laser curing rapidly bonds the layer without need for pressure.

In this example, blanket rolling is done by side-mounted wide and heavy rollers designed to run over the entire bed. The purpose of these heavy rollers is to exert much heavier pressure than the ones attached to the ribbon application head (965). These heavy rollers can be metal or rubber, and roll over each and every object being produced on the bed (925) each time they run over the bed (925). Blanket rolling does not happen after each layer is applied but over multiple layers simultaneously or at the end of the layering process. In this example, the blanket rollers are similar to those used on letter-press printing machines that are heated internally for curing of adhesive during the rolling process. In alternative examples, the blanket rollers may be refrigerated or emit ultrasound waves when required for curing of adhesive during the rolling process.

In this example, membrane pressing is available using a flexible membrane over the bed (925) that is sucked down toward the bed (925) by vacuum. The vacuum is created by sucking out all the air via small holes in the bed (925). This allows the membrane to flex over every shape of object on the Machine bed and is conventional technology modified for use as required.

In this example, plate pressing is available by manual clamping or hydraulic pressing with heavy plates are located above parts of the bed (925) where pressure is required to be focused. The hardware for this is a part of the Machine Bed.

Example of Bed Operation and Activity

The bed (925) of the computer numerical control machine (905) is the component upon which the layered object (405) is built. The bed (925) is a complex component having its own sub-components. In other examples, the sub-components may be optional or used in any variety of combination to facilitate each object that is being produced. The outer dimensions of the space in the horizontal X and Y axes define a work area of the bed (925).

In this example, the bed (925) is able to traverse in the X & Y axes coordinated with the ribbon application head (965). In other examples, the bed (925) may be fixed. The bed (925) travel vertically to set intervals, wherein the vertical intervals can be manipulated by the digital specification programmed on the computer numerical control machine (905) to work in conjunction with the continuous ribbons dispensed from the plurality of feeder cassettes (1405) and the micro-lamination requirements of the material in ribbon form.

The bed (925) in this example is an unbroken plate surface, but in other examples may comprise a plate surface formed of multiple components in different parts of the total work area of the bed (925). Components of the surface of the bed (925) include sub areas which offer pin control (945) of the layered object (405) using flat-pin-heads.

The bed (925) in this example has a traversing bed with the ability to slide in both the X&Y axes horizontally, to an accuracy of 0.1 millimeters (mm) per axis. The sliding limit is to the extent of the width or length of the bed (925) in the respective axis. In this case, the bed (925) in this example has a width 1200 mm that can slide 600 mm-plus or 600 mm-minus from zero on its X-axis. Diagonal traversing is done by sliding in both axes simultaneously. This is done by digital specification programmed on the computer numerical control machine (905), which controls the sliding movement. The bed (925) is attached via a network of rollers (920) with precision bearings sliding upon guides located under the bed (925), such that smooth uninterrupted movement in X and Y axes can be manipulated for uni-directional or diagonal movement. Traversing may take place simultaneously and independent of the movement of the ribbon application head (965).

Vertical travel of the bed (925) is accomplished when the entire mechanism of the bed (925), the guides and rollers below, can all move up or down as needed purely in the Z-axis. This movement is controllable to the accuracy of 0.1 mm. This movement might be undertaken by an option of hydraulic, pneumatic or purely mechanical mechanism controlled by the principal software guiding and controlling the entire process.

The bed (925) has an air-control system added to its surface via an air cushion and vacuum. While both a cushion and a vacuum are not possible simultaneously, they are interchangeable during any process as needed to create an air cushion or a vacuum hold. The vacuum hold is usable for membrane pressing for the micro-lamination.

The air cushion and vacuum functions are achieved by having a system of blowing air in or out of tiny holes in the surface of the bed (925). A compressor (935) controls the master operation via series of valves and pressure guides to ensure the right amount of air pressure to the surface for cushioning or the right negative-pressure of vacuum to hold or to press for micro-lamination. The entire bed has holes for either function, but other embodiments may have holes in portions of the bed (925). In a fully sealed area connected to the holes, air pressure is created via piping that is flexible and conveyed via caterpillar-style continuous tracks delivering the piping to the underside of the bed (925). The piping moves with the traversing and travelling of the bed (925) to retain unbroken control. For membrane pressing, the amount of vacuum pressure is increased to suit the desired pressure exerted by the membrane upon the objects being constructed on the bed (925).

For this example, a pin bed occupies a portion of the total bed surface. It is made of multiple-pin heads such that when the pin-heads are level in one plane they form a continuous flat surface. However, each pin-head can be actuated individually to go up or down to the accuracy of 0.1 mm. The relative height of each of these pin-heads can therefore create a voxellated continuous surface in 3-D similar to pin-bed toys used to create surfaces via mechanical pressure. In pin-bed toys the pins can move easily with change in pressure applied by fingers, but in case of this pin bed, the area of the bed formed by pin-heads can remain rigid to endure pressure from any of the pressing methods for micro-lamination. The pin heads can similarly be held rigidly in place at variable heights without moving under pressure during micro-lamination. This rigidity is achieved by hydraulic controls, but in other embodiments may be pneumatic or mechanically actuated controls managed by the digital specification programmed on the computer numerical control machine (905).

In this example, each flat pin head is square and fits without gaps with other pin heads around it when flat in one plane. The area of the pin head does not exceed 100 square centimeters (10 cm.×10 cm.). In other examples, the area of the pin head may be reduced to any smaller square module as needed to implement the digital specification programmed on the computer numerical control machine (905). The pin heads incorporate holes and have sealed access to the air-control system for air-cushion or vacuum, as needed.

Example of Modulated Membrane

In this example, the bed (925) has a membranous material made rigid by stretching. This membranous material is raised or inflated as required the bed (925) to define a controlled shape above the bed (925). The membranous material is like a balloon made of multiple membranes. The shape of inflation and deflation the extent of inflation and the rigidity of the inflation is pneumatically controlled via the compressor (935). In an alternate exemplary embodiment, the membranous material may replace the entire bed.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the manufacturing industry.

What is claimed is:

1. A method of producing a product using stratified additive manufacturing, the method comprising the steps of:
   preparing a plurality of continuous ribbons of first material, said first material having a solid state, the plurality of continuous ribbons comprising a plurality of different widths;
   wherein each continuous ribbon comprises a top surface and a bottom surface; and further comprising the step of attaching a radio-frequency identification tag to the bottom surface;
   rolling each continuous ribbon in the plurality of continuous ribbons onto a spool held within a feeder cassette so that each feeder cassette holds one roll of continuous ribbon and so that there are a plurality of feeder cassettes, each feeder cassette configured to dispense continuous ribbon through a slit in said feeder cassette;
   loading each feeder cassette in the plurality of feeder cassettes onto an engagement dock of a computer numerical control machine;
   dispensing above the computer numerical control machine a first portion of continuous ribbon from a first feeder cassette in the plurality of feeder cassettes while preserving the solid state of the first portion;
   cutting the first portion to a length and having an end profile as directed by digital specification programmed on the computer numerical control machine; and
   creating a layered object by dispensing, cutting and applying additional portions of continuous ribbon from one or more feeder cassettes in the plurality of feeder cassettes where each of the additional portions has a butt joint with a previously dispensed portion or is added atop the previously dispensed portion in accordance with the digital specification programmed on the computer numerical control machine.

2. The method of claim 1, wherein the additional portions of continuous ribbon are dispensed so that any butt joint is covered by a next layer applied atop the butt joint so as to form a woven connectivity.

3. The method of claim 1, further comprising the step of selecting the first material from the group consisting of wood veneer, metal, plastic, cork, leather, fabric, fiber and any combination of these.

4. The method of claim 1, wherein each continuous ribbon comprises a top surface and a bottom surface; and further comprising the step of adding an adhesive to said bottom surface.

5. The method of claim 1, further comprising the step of spraying at least one continuous ribbon in the plurality of continuous ribbons with particles, said particles selected from the group consisting of an electrical conductor, an electrical insulator, a paint, a dye and a pigment, a chemically reactive agent; and a penetrant.

6. The method of claim 1, further comprising the step of milling the layered object prior to completing actions of dispensing, cutting and applying additional portions of continuous ribbon.

7. The method of claim 1, further comprising the step of:
preparing a continuous ribbon of second material, said second material having a solid state, the second material being different from the first material;
rolling the continuous ribbon of second material onto the spool held within a second feeder cassette so that the second feeder cassette holds one roll of continuous ribbon of second material;
loading the second feeder cassette holding the continuous ribbon of second material onto the engagement dock of the computer numerical control machine;
dispensing onto a previously dispensed portion a measured length of such continuous ribbon of second material through the slit in said second feeder cassette while preserving the solid state of the second material; and
cutting the measured length to the end profile directed by digital specification programmed on the computer numerical control machine.

* * * * *